United States Patent
Sharma et al.

(10) Patent No.: US 11,477,737 B2
(45) Date of Patent: Oct. 18, 2022

(54) SYSTEMS AND METHODS FOR INVESTIGATING AND ADDRESSING BATTERY LIFE DEGRADATION OF DEVICES, SUCH AS IOT DEVICES, IN A CELLULAR COMMUNICATIONS NETWORK

(71) Applicant: Telefonaktiebolaget LM Ericsson (publ), Stockholm (SE)

(72) Inventors: Nipun Sharma, New Delhi (IN); Venkata Sameer Kumar Kodukula, Noida (IN); Rohit Shukla, Noida (IN); George Foti, Dollard des Ormeaux (CA); Virgilio Fiorese, McKinney, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/059,454

(22) PCT Filed: May 29, 2018

(86) PCT No.: PCT/US2018/034929
§ 371 (c)(1),
(2) Date: Nov. 29, 2020

(87) PCT Pub. No.: WO2019/231435
PCT Pub. Date: Dec. 5, 2019

(65) Prior Publication Data
US 2021/0219238 A1 Jul. 15, 2021

(51) Int. Cl.
*H04W 52/02* (2009.01)
*G16Y 10/75* (2020.01)
(Continued)

(52) U.S. Cl.
CPC ......... *H04W 52/0261* (2013.01); *G16Y 10/75* (2020.01); *G16Y 20/30* (2020.01); *H04W 36/0083* (2013.01)

(58) Field of Classification Search
CPC ......... H04W 52/0261; H04W 36/0083; G16Y 10/75; G16Y 20/30; Y02D 30/70
See application file for complete search history.

(56) References Cited

U.S. PATENT DOCUMENTS 8,644,813 B1 * 2/2014 Gailloux ............... H04W 24/08
455/423
9,860,257 B1 1/2018 Kumar et al.
(Continued)

FOREIGN PATENT DOCUMENTS

WO 2017036656 A1 3/2017

OTHER PUBLICATIONS

Author Unknown, Technical Specification Group Services and System Aspects; Architecture enhancements to facilitate communications with packet data networks and applications (Release 15); Technical Specification 23.682, Version 15.3.0, 3GPP Organizational Partners, Dec. 2017, 123 pages.
(Continued)

*Primary Examiner* — Marisol Figueroa
(74) *Attorney, Agent, or Firm* — Sage Patent Group

(57) ABSTRACT

Systems and methods for investigating and addressing excessive battery drainage in a wireless device in a cellular communications system are disclosed. In some embodiments, a method in a core network of a cellular communications system comprises receiving, from an external entity, a request to investigate excessive battery drainage at a particular wireless device and initiating collection of information related to operation of the wireless device. The information comprises user plane data, control plane information, and/or network information related to the wireless device. The method also comprises collecting the information from one or more network nodes in the cellular communications system, analyzing the collected information to determine one or more root causes of excessive battery drainage at the wireless device, and initiating one or more actions in the cellular communications system to mitigate excessive battery drainage at the wireless device.

20 Claims, 16 Drawing Sheets

(51) Int. Cl.
*G16Y 20/30* (2020.01)
*H04W 36/00* (2009.01)

(56) References Cited

U.S. PATENT DOCUMENTS

| 2006/0217152 | A1* | 9/2006 | Fok | H01M 10/48 |
| | | | | 455/557 |
| 2007/0091836 | A1 | 4/2007 | Oprescu-Surcobe et al. | |
| 2010/0313270 | A1 | 12/2010 | Kim et al. | |
| 2012/0054304 | A1* | 3/2012 | Pica | H04W 24/08 |
| | | | | 709/217 |

OTHER PUBLICATIONS

Author Unknown, Technical Specification Group Core Network and Terminals; Evolved Packet System (EPS); Mobility Management Entity (MME) and Serving GPRS Support Node (SGSN) related interfaces based on Diameter protocol (Release 15); Technical Specification 29.272, Version 15.2.0, 3GPP Organizational Partners, Dec. 2017, 165 pages.

Author Unknown, Technical Specification Group Core Network and Terminals; Home Subscriber Server (HSS) diameter interfaces for interworking with packet data networks and applications (Release 15); Technical Specification 29.336, Version 15.1.0, 3GPP Organizational Partners, Dec. 2017, 66 pages.

Author Unknown, Technical Specification Group Services and System Aspects; 3G security; Lawful interception architecture and functions (Release 14); Technical Specification 33.107, Version 14.3.0, 3GPP Organizational Partners, Sep. 2017, 346 pages.

Author Unknown, "Blood Pressure Monitor APIs," Open Mobile Alliance (OMA), OMA-TS-Blood_Pressure_Monitor_APIs-V1_0-20160419-C, Candidate Version 1.0, Open Mobile Alliance Ltd., Apr. 19, 2016, 46 pages.

Author Unknown, "Device WebAPI-PCH," Open Mobile Alliance (OMA), OMA-ER-Device_WebAPIs-V1_0-20160419-C, Candidate Version 1.0, Open Mobile Alliance Ltd., Apr. 19, 2016, 78 pages.

ETSI MCC, "R2-1712101: Report of 3GPP TSG-RAN2#99bis meeting, Prague, Czech Republic," Third Generation Partnership Project (3GPP), TSG-RAN WG2 meeting #100, Nov. 27-Dec. 1, 2017, 238 pages, Reno, Nevada, USA.

International Search Report and Written Opinion for International Patent Application No. PCT/US2018/034929, dated Jan. 29, 2019, 15 pages.

* cited by examiner

SYSTEMS AND METHODS FOR INVESTIGATING AND ADDRESSING BATTERY LIFE DEGRADATION OF DEVICES, SUCH AS IOT DEVICES, IN A CELLULAR COMMUNICATIONS NETWORK

This application is a 35 U.S.C. § 371 national phase filing of International Application No. PCT/US2018/034929, filed May 29, 2018, the disclosure of which is incorporated herein by reference in its entirety.

TECHNICAL FIELD

The present disclosure relates to a cellular communications network and, in particular, to intelligence for detecting and addressing battery life degradation of wireless devices (e.g., Internet of Things (IoT) devices) in the cellular communications network.

BACKGROUND

With the forecast of massive Internet of Things (IoT) deployment in the Third Generation Partnership Project (3GPP) Long Term Evolution (LTE) network, the operator faces an acute challenge of preventive maintenance of the IoT devices. Narrowband IoT (NB-IoT) devices are expected to have over ten years of battery life. Manually checking the battery power pattern for IoT devices and performing an analysis of the battery power pattern for battery life degradation is expected to incur high levels of Operational Expenditures (OPEX) driven by the need of inspections of the IoT devices by humans. Detecting and addressing battery life degradation is particularly important in industries, such as mining, that require automation to increase productiveness and safety. Hence, there is a need for systems and methods to address this issue.

SUMMARY

Systems and methods for investigating and addressing excessive battery drainage in a wireless device (e.g., an Internet of Things (IoT) device) in a cellular communications system are disclosed. In some embodiments, a method in a core network of a cellular communications system comprises receiving, from an external entity, a request to investigate excessive battery drainage at a particular wireless device and initiating collection of information related to operation of the wireless device in the cellular communications system. The information comprises user plane data related to the wireless device, control plane information related to the wireless device, and/or network information related to the wireless device. The method also comprises collecting the information from one or more network nodes in the cellular communications system, analyzing the collected information to determine one or more root causes of excessive battery drainage at the wireless device, and initiating one or more actions in the cellular communications system to mitigate excessive battery drainage at the wireless device, the one or more actions being based on the one or more root causes of excessive battery drainage at the wireless device.

In some embodiments, the one or more nodes include a Service Capability Exposure Function (SCEF), a Home Subscriber Server (HSS), and/or a Mobility Management Entity (MME).

In some embodiments, the method further comprises reporting, to the external entity, the one or more root causes of excessive battery drainage at the wireless device and/or the one or more actions.

In some embodiments, the information related to operation of the wireless device in the cellular communications system comprises user plane data related to the wireless device, control plane information related to the wireless device, and network information related to the wireless device.

In some embodiments, receiving the request to investigate excessive battery drainage at the wireless device comprises receiving the request at an exposure function of the core network. Further, in some embodiments, the cellular communications system is a Long Term Evolution (LTE) system, and the exposure function is a SCEF. In some other embodiments, the cellular communications system is a Fifth Generation (5G) New Radio (NR) system, and the exposure function is a Network Exposure Function (NEF).

In some embodiments, initiating collection of the information related to operation of the wireless device in the cellular communications system comprises initiating, by the exposure function, reporting of user plane data, control plane information, and network information related to the wireless device from the one or more network nodes to an analytics node. Further, collecting the information from the one or more network nodes comprises receiving the reported user plane data, control plane information, and network information at the analytics node, and storing the reported user plane data, control plane information, and network information at the analytics node. Analyzing the collected information comprises analyzing the collected information at the analytics node.

In some embodiments, analyzing the collected information comprises correlating the collected information with respect to time to thereby provide correlated information, identifying a pattern of network activity based on the correlated information, and determining the one or more root causes of excessive battery drainage at the wireless device based on the pattern of network activity. Further, in some embodiments, the pattern of network activity is a pattern of handovers back and forth between two or more adjacent cells and/or between two or more base stations, and the one or more root causes of excessive battery drainage at the wireless device comprise an excessive amount of handovers. Further, in some embodiments, the one or more actions comprise changing at least one handover parameter for the wireless device such that an amount of handovers for the wireless device between the two or more adjacent cells and/or the two or more base stations is reduced. This excessive handover information can, in some embodiments, be sent to the operator Operations Support System (OSS) team for manual intervention (e.g., planning, optimization of the network, or offline activity). In some other embodiments, the pattern of network activity is a pattern that is indicative of a variation in user plane data, and the one or more root causes of excessive battery drainage at the wireless device comprises a variation in user plane data. Further, in some embodiments, the variation in user plane data is a variation in an amount of user plane data transmitted by the wireless device, a variation in a frequency at which user plane data is transmitted by the wireless device, or a variation in content of user plane data transmitted by the wireless device.

In some embodiments, the one or more actions comprise increasing a sleep time for the wireless device.

In some embodiments, the one or more root causes of excessive battery drainage at the wireless device comprise an excessive amount of handovers. Further, in some embodiments, the one or more actions comprise changing at least one handover parameter for the wireless device such that an amount of handovers for the wireless device is reduced.

In some embodiments, the one or more root causes of excessive battery drainage at the wireless device comprise a variation in user plane data. Further, in some embodiments, the variation in user plane data is a variation in an amount of user plane data transmitted by the wireless device, a variation in a frequency at which user plane data is transmitted by the wireless device, or a variation in content of user plane data transmitted by the wireless device. In some embodiments, the one or more actions comprise increasing a sleep time of the wireless device.

In some embodiments, the external entity is a Service Capability Server (SCS)/Application Server (AS).

Embodiments of a method of operation of a core network node are also disclosed. In some embodiments, a method in a core network node of a core network of a cellular communications system comprises receiving, from an external entity, a request to investigate excessive battery drainage at a particular wireless device, and initiating collection of information related to operation of the wireless device in the cellular communications system. The information comprises user plane data related to the wireless device, control plane information related to the wireless device, and/or network information related to the wireless device. The method further comprises receiving a report of an analysis of the collected information. The report comprises one or more root causes of excessive battery drainage at the wireless device and/or one or more actions taken by the core network to address the one or more root causes of excessive battery drainage at the wireless device. The method further comprises providing a response to the external entity based on the report.

In some embodiments, a method in a core network node for a core network of a cellular communications system comprises collecting information from one or more network nodes in the cellular communications system. The information is related to operation of a specific wireless device in the cellular communications system and comprising user plane data related to the wireless device, control plane information related to the wireless device, and/or network information related to the wireless device. The method further comprises analyzing the collected information to determine one or more root causes of excessive battery drainage at the wireless device, and initiating one or more actions in the cellular communications system to mitigate excessive battery drainage at the wireless device, the one or more actions being based on the one or more root causes of excessive battery drainage at the wireless device.

Embodiments of a core network are also disclosed. In some embodiments, a core network of a cellular communications system is adapted to receive, from an external entity, a request to investigate excessive battery drainage at a particular wireless device, and initiate collection of information related to operation of the wireless device in the cellular communications system. The information comprises user plane data related to the wireless device, control plane information related to the wireless device, and/or network information related to the wireless device. The core network is further adapted to collect the information from one or more network nodes in the cellular communications system, analyze the collected information to determine one or more root causes of excessive battery drainage at the wireless device, and initiate one or more actions in the cellular communications system to mitigate excessive battery drainage at the wireless device, the one or more actions being based on the one or more root causes of excessive battery drainage at the wireless device.

In some embodiments, a core network of a cellular communications system comprises a first core network node and a second core network node. The first core network node comprises one or more processors and memory storing instructions executable by the one or more processors whereby the first core network node is operable to receive, from an external entity, a request to investigate excessive battery drainage at a particular wireless device, and initiate collection of information related to operation of the wireless device in the cellular communications system. The information comprises user plane data related to the wireless device, control plane information related to the wireless device, and/or network information related to the wireless device. The second core network node comprises one or more processors and memory storing instructions executable by the one or more processors whereby the second core network node is operable to collect the information from one or more network nodes in the cellular communications system, analyze the collected information to determine one or more root causes of excessive battery drainage at the wireless device, and initiate one or more actions in the cellular communications system to mitigate excessive battery drainage at the wireless device, the one or more actions being based on the one or more root causes of excessive battery drainage at the wireless device.

Embodiments of a core network node for a core network of a cellular communications system are also disclosed. In some embodiments, a core network is adapted to receive, from an external entity, a request to investigate excessive battery drainage at a particular wireless device, and initiate collection of information related to operation of the wireless device in the cellular communications system. The information comprises user plane data related to the wireless device, control plane information related to the wireless device, and/or network information related to the wireless device. The core network node is further adapted to receive a report of an analysis of the collected information. The report comprises one or more root causes of excessive battery drainage at the wireless device and/or one or more actions taken by the core network to address the one or more root causes of excessive battery drainage at the wireless device. The core network node is further adapted to provide a response to the external entity based on the report.

In some embodiments, a core network node for a core network of a cellular communications system comprises one or more processors and memory storing instructions executable by the one or more processors whereby the first network node is operable to: receive, from an external entity, a request to investigate excessive battery drainage at a particular wireless device; initiate collection of information related to operation of the wireless device in the cellular communications system, the information comprising user plane data related to the wireless device, control plane information related to the wireless device, and/or network information related to the wireless device; receive a report of an analysis of the collected information, the report comprising one or more root causes of excessive battery drainage at the wireless device and/or one or more actions taken by the core network to address the one or more root causes of excessive battery drainage at the wireless device; and provide a response to the external entity based on the report.

In some embodiments, a core network node for a core network of a cellular communications system is adapted to collect information from one or more network nodes in the cellular communications system. The information is related to operation of a specific wireless device in the cellular communications system and comprising user plane data related to the wireless device, control plane information related to the wireless device, and/or network information related to the wireless device. The core network node is further adapted to analyze the collected information to determine one or more root causes of excessive battery drainage at the wireless device, and initiate one or more actions in the cellular communications system to mitigate excessive battery drainage at the wireless device, the one or more actions being based on the one or more root causes of excessive battery drainage at the wireless device.

In some embodiments, a core network node for a core network of a cellular communications system comprises one or more processors and memory storing instructions executable by the one or more processors whereby the first network node is operable to: collect information from one or more network nodes in the cellular communications system, the information being related to operation of a specific wireless device in the cellular communications system and comprising user plane data related to the wireless device, control plane information related to the wireless device, and/or network information related to the wireless device; analyze the collected information to determine one or more root causes of excessive battery drainage at the wireless device; and initiate one or more actions in the cellular communications system to mitigate excessive battery drainage at the wireless device, the one or more actions being based on the one or more root causes of excessive battery drainage at the wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
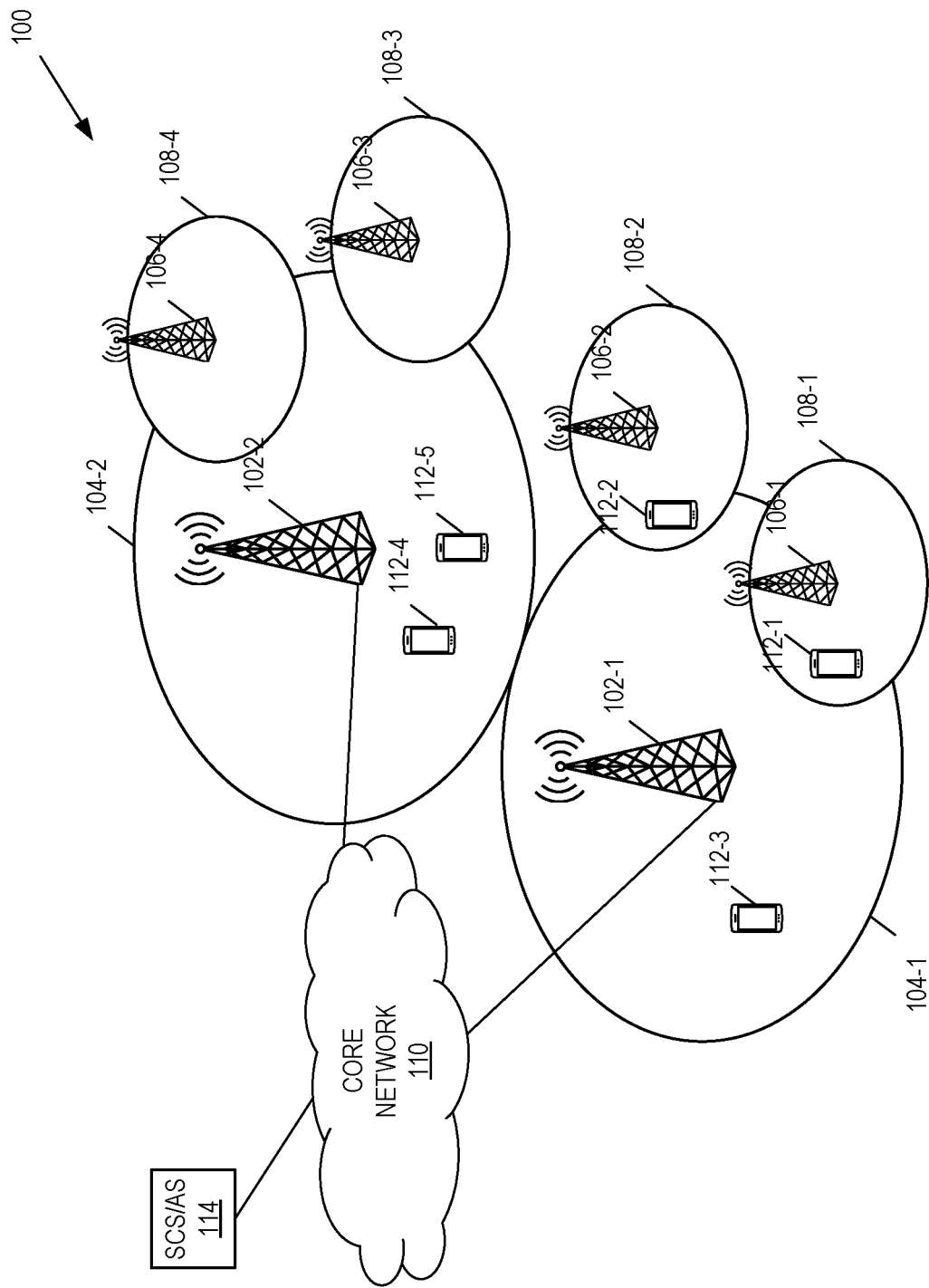
FIG. 1 illustrates one example of a cellular communications network according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), Home Subscriber Server (HSS), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Systems and methods are disclosed herein for intelligent detection of a root cause(s) of excessive battery life degradation (i.e., excessive battery drainage) at a particular wireless device and automated network optimization to address the root cause(s) such that continued battery life degradation is minimized. While these systems and methods are particularly beneficial for Internet of Things (IoT) devices and Narrowband IoT (NB-IoT) devices, the present disclosure is not limited thereto.

In this regard, FIG. 1 illustrates one example of a cellular communications network 100 according to some embodiments of the present disclosure. In the embodiments described herein, the cellular communications network 100 is 3GPP LTE network or a 3GPP a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Note that a Service Capability Server (SCS)/Application Server (AS) 114 is connected to the core network 110 via appropriate interfaces. Via the core network 110, the SCS/AS 114 transfers data to and/or receives data from wireless devices 112 such as, e.g., MTC UEs such as IoT UEs or NB-IoT UEs.

Figure 2:
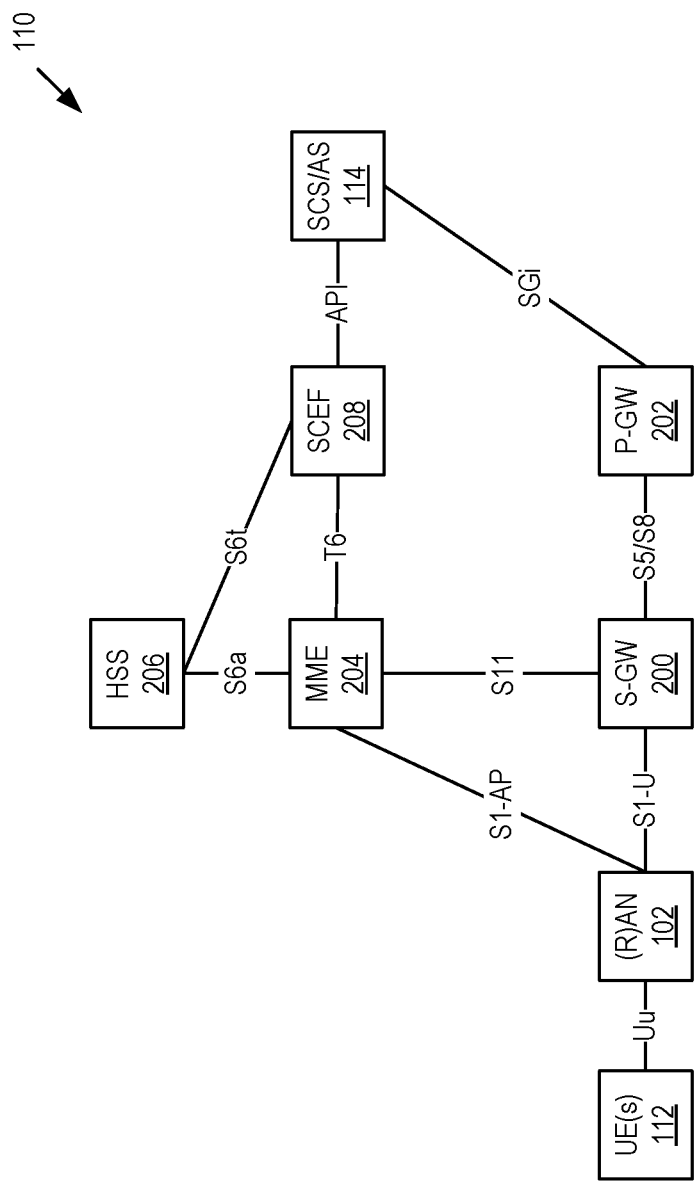
FIG. 2 illustrates one example of a cellular communications network in which the cellular communications network is a Third Generation Partnership Project (3GPP) Long Term Evolution (LTE) network.

FIG. 2 illustrates one example of the cellular communications network 100 in which the cellular communications network 100 is a 3GPP LTE network. In particular, the core network 110 is an Evolved Packet Core (EPC), which includes various core network nodes such as, for example, a Serving Gateway (S-GW) 200, a P-GW 202, a MME 204, a HSS 206, and a SCEF 208, as will be appreciated by one of skill in the art. The SCS/AS 114 has access to the core network 110 via the SCEF 208 and sends and receives data to associated UEs 112 via the P-GW 202, as will be appreciated by one skill in the art.

Currently in the LTE architecture, the HSS 206 is the node which acts as a repository for subscriber profile information which is used for handover and session management operations. For a UE 112 that is a Cellular IoT (CIoT) UE, in addition to parameters for the handover information reaching the HSS 206, the HSS 206 also receives Communication Parameters such as those defined in Technical Specification (TS) 23.682, which include a periodic communication indicator, communication duration time, scheduled communication time, periodic time, and stationary indication. The nature of this information is periodic apart from the stationary indication which is non-periodic. Other UE related information is sent to the HSS 206 over the S6t interface from the SCEF 208. These are well defined in the Attribute-Value Pairs (AVP) message structure as defined in TS 29.336.

Figure 3:
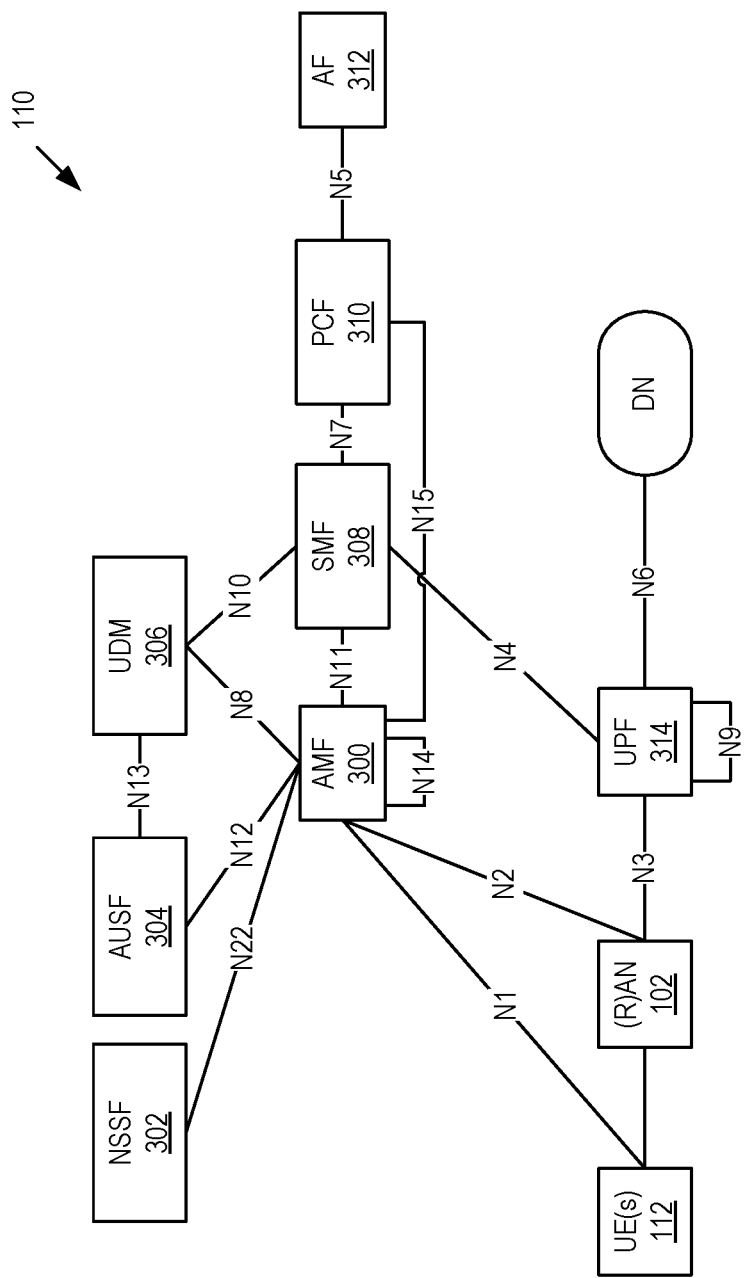
FIG. 3 illustrates a wireless communication system represented as a Fifth Generation (5G) network architecture composed of core Network Functions (NFs), where interaction between any two NFs is represented by a point-to-point reference point/interface.

FIG. 3 illustrates a wireless communication system represented as a 5G network architecture composed of core Network Functions (NFs), where interaction between any two NFs is represented by a point-to-point reference point/ interface. FIG. 3 is one particular implementation of the system 100 of FIG. 1.

Seen from the access side the 5G network architecture shown in FIG. 3 comprises a plurality of UEs 112 connected to either a Radio Access Network (RAN) or an Access Network (AN) as well as an Access and Mobility Management Function (AMF) 300. Typically, the R(AN) comprises base stations 102, e.g. such as eNBs or gNBs or similar. Seen from the core network side, the 5G core NFs shown in FIG. 3 include a Network Slice Selection Function (NSSF) 302, an Authentication Server Function (AUSF) 304, a Unified Data Management (UDM) 306, an AMF 300, a Session Management Function (SMF) 308, a Policy Control Function (PCF) 310, and an Application Function (AF) 312. While not illustrated, a Network Exposure Function (NEF) provides an interface between the core network 110 and the SCS/AS 114.

Reference point representations of the 5G network architecture are used to develop detailed call flows in the normative standardization. The N1 reference point is defined to carry signaling between the UE 112 and the AMF 300. The reference points for connecting between the AN 102 and AMF 300 and between the AN 102 and a User Plane Function (UPF) 314 are defined as N2 and N3, respectively. There is a reference point, N11, between the AMF 300 and the SMF 308, which implies that the SMF 308 is at least partly controlled by the AMF 300. N4 is used by the SMF 308 and the UPF 314 so that the UPF 314 can be set using the control signal generated by the SMF 308, and the UPF 314 can report its state to the SMF 308. N9 is the reference point for the connection between different UPFs 314, and N14 is the reference point connecting different AMFs 300, respectively. N15 and N7 are defined since the PCF 310 applies policy to the AMF 300 and the SMF 308, respectively. N12 is required for the AMF 300 to perform authentication of the UE 112. N8 and N10 are defined because the subscription data of the UE 112 is required for the AMF 300 and the SMF 308.

The 5G core network aims at separating user plane and control plane. The user plane carries user traffic while the control plane carries signaling in the network. In FIG. 3, the UPF 314 is in the user plane and all other NFs, i.e., the AMF 300, SMF 308, PCF 310, AF 312, AUSF 304, and UDM 306, are in the control plane. Separating the user and control planes guarantees each plane resource to be scaled independently. It also allows UPFs 314 to be deployed separately from control plane functions in a distributed fashion. In this architecture, UPFs 314 may be deployed very close to UEs 112 to shorten the Round Trip Time (RTT) between UEs 112 and the data network for some applications requiring low latency.

The core 5G network architecture is composed of modularized functions. For example, the AMF 300 and the SMF 308 are independent functions in the control plane. Separating the AMF 300 and the SMF 308 allows independent evolution and scaling. Other control plane functions like the PCF 310 and the AUSF 304 can be separated as shown in FIG. 3. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs 314.

Figure 4:
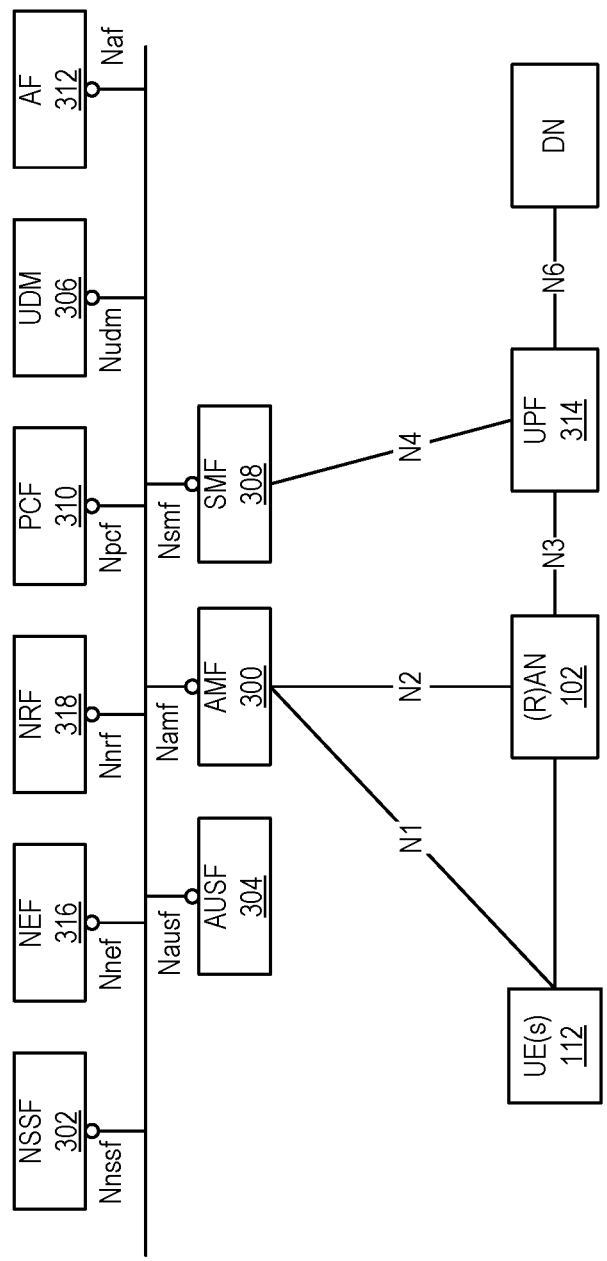
FIG. 4 illustrates a 5G network architecture using service-based interfaces between the NFs in the control plane instead of the point-to-point reference points/interfaces used in the 5G network architecture of FIG. 3.

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF 300 and Nsmf for the service based interface of the SMF 308, etc. A NEF 316 and a Network Repository Function (NRF) 318 in FIG. 4 are not shown in FIG. 3 discussed above. However, it should be clarified that all NFs depicted in FIG. 3 can interact with the NEF 316 and the NRF 318 of FIG. 4 as necessary, though not explicitly indicated in FIG. 3. Also, the NEF 316 provides an interface via which the SCS/AS 114 can communicate with the core network 110.

Some properties of the NFs shown in FIGS. 3 and 4 may be described in the following manner. The AMF 300 provides UE-based authentication, authorization, mobility management, etc. A UE 112 even using multiple access technologies is basically connected to a single AMF 300 because the AMF 300 is independent of the access technologies. The SMF 308 is responsible for session management and allocates Internet Protocol (IP) addresses to UEs 112. The SMF 308 also selects and controls the UPF 314 for data transfer. If a UE 112 has multiple sessions, different SMFs 308 may be allocated to each session to manage them individually and possibly provide different functionalities per session. The AF 312 provides information on the packet flow to the PCF 310 responsible for policy control in order to support Quality of Service (QoS). Based on the information, the PCF 310 determines policies about mobility and session management to make the AMF 300 and the SMF 308 operate properly. The AUSF 304 supports authentication functions for UEs 112 or similar and thus stores data for authentication of UEs 112 or similar while the UDM 306 stores subscription data of the UE 112. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

With the forecast of massive IoT deployment in the LTE and NR network, the operator faces an acute challenge of preventive maintenance of the IoT devices. NB-IoT devices are expected to have, e.g., a battery life of ten or more years. The battery power pattern for the devices can be checked manually and be used to manually perform an analysis of battery life degradation. However, such manual activity is expected to incur high levels of Operational Expenditures (OPEX) driven by the need inspections of the devices by humans. Certain industries, such as mining, require automation to increase productiveness and safety. Hence, an automated solution is desired to address this concern.

In current systems, the SCS/AS has access to specific MTC device related application information. However, specifically for NB-IoT or CAT-M1/LTE-M devices, any degradation in the battery life of the device cannot be investigated at the SCS/AS level because of the limited availability of network related information at the SCS/AS.

Systems and methods are disclosed herein that enable the SCS/AS 114 to send a request to the core network 110 in the network operator's domain to ask that excessive degradation of battery life at a particular wireless device 112 (e.g., a MTC device such as an IoT device, e.g., a NB-IoT device or a CAT-M device). For example, once the SCS/AS 114 determines that the battery life for a particular wireless device 112 has degraded more than expected (e.g., battery life has degraded by 30% in the first year of commission), then the SCS/AS 114 can ask the network operator to start an analysis for that particular wireless device 112 and provide respective feedback. In some scenarios, the excessive degradation in the battery life of the wireless device 112 may be due to the internal operation of the network (e.g., excessive handovers for a limited mobility MTC device located at a cell edge). This knowledge is not available at the SCS/AS level and, hence, the solution is to position the analysis in the network operator's domain. For this to happen, embodiments of the present disclosure provide for the collection and storage of additional network information (e.g., information from the core network 110 and/or the RAN) related to the particular device. This additional information coupled with the specifics of user plane data transmitted and/or received by the wireless device 112 can be leveraged to perform focused analytics to find out a root cause(s) of the excessive battery life degradation at the wireless device 112. Appropriate network optimizations can then be made.

A few use cases of such scenario can be thought of as below:

UE power dissipation due to excessive signaling handovers across eNBs/cells: As an example, an IoT device with limited mobility (less than 500-750 meters) might experience excessive battery life dissipation as a result of excessive eNB handovers. For instance, the IoT device may be a device on an automated machine (e.g., a crane or robot) that moves around in a factory covering 1 square kilometer, where an eNB/cell boundary passes through the area of the factory. This results in a large number of eNB/cell handovers for the IoT device with no additional transfer of payloads. Such handovers when no payload is transferred can be viewed as an unnecessary handover.

UE roaming scenario counts: The network will know whether an IoT UE is in roaming or not for a specific interrogation. However, it will be useful if the roaming Visited Public Land Mobile Network (VPLMN) information is made available to network nodes for further analysis in order to provide a meaningful (i.e., actionable) outcome. For example, the outcome of the analysis might be that the particular UE has roamed 10 times in last 3 days, but no payload or no similar payload is being transferred to/from the UE when in roaming as compared to when the UE is not in roaming.

Irregular Signal to Interference plus Noise Ratio (SINR) Pattern: Irregular SINR pattern to affect the battery consumption of the UE. SINR is typically calculated by the UE and used for providing feedback to the network like Channel Quality Indicator (CQI). The network can later use this information for further optimization. Higher SINR indicates more disturbance and needs to be further investigated, e.g., via physical inspection.

These types of information will be useful to give a contextual meaning of the IoT UE related analytics performance.

Apart from the above, in some embodiments, user plane data related to the wireless device 112 is also collected and stored for analysis in addition to the collected and stored control plane information and network information related to the wireless device 112. This information will be helpful to analyze the nature of the device payload delivered over the core network and RAN supported by the signaling information mentioned above. For example, an IoT device may be a sensor that reports data such as, e.g., a weather condition like humidity, temperature, etc. or an adverse weather condition like raining. Using an adverse weather condition as an example, if the IoT device reports when it is raining, a rainy season might lead to degraded battery performance, etc. Another example of sensor data passed into the user plane is the physical conditions of the wireless device 112. For example, the physical conditions of the wireless device 112 may affect power consumption.

As discussed below, in some embodiments, the results of the analysis of the collected information are quantified and reported back to the SCS/AS 114, e.g., so as to better equip the SCS/AS 114 with the intelligence to pinpoint the reason(s) for excessive battery life degradation at the wireless device 112. This will further help to initiate a better preventive operation and plan for future deployments including network optimization.

In some embodiments, the SCS/AS 114 triggers the core network 110 to collect, store, and analyze data related to a particular wireless device 112 (e.g., a MTC device such as an IoT UE, a NB-IoT UE, or a CAT-M UE). In some embodiments, the SCS/AS 114 detects a deviation in the battery life of the wireless device 112 from a forecasted level and, in response, initiates a trigger towards the core network 110 to capture additional information related to the wireless device 112 and to store this information for future analysis. This trigger is received by the SCEF 208 in LTE or the NEF 316 in 5G NR. Further, the analysis can be performed by an existing node of the core network 110 (e.g., AF or Network Data Analytics Function (NWDAF)) or new node. In either case, the node that performs the analysis is referred to herein as an analytics node. The periodicity at which the SCS/AS 114 checks for a deviation in the battery life of the wireless device 112 from the forecasted level is, in some embodiments, variable or configurable depending upon the type of wireless device; however, as an example, it can be anywhere between 3-6 months depending on, e.g., the network operator's operations and management activities.

When the SCEF/NEF 208/316 is requested to initiate collection of information related to a particular wireless device 112, the SCEF/NEF 208/316 will initiate the collection of control plane information related to that wireless device 112, user plane data transmitted to and/or from that wireless device 112, and/or network information related to that wireless device 112. As an example, the collected information may include:

User Plane Data: For example, the SCEF/NEF 208/316 may initiate sending of user plane data of the wireless device 112 over an additional interface to the analytics node (e.g., via an interface similar to the X2 interface for HSS defined in TS 33.107). In some embodiments, the user plane data is in accordance with the Specification Standards of Open Mobile Alliance (OMA). As one particular example, the wireless device 112 is a weather sensor, and the user plane data includes weather related data such as, e.g., humidity, temperature, etc. reported by the wireless device 112.

Network Related Information: For example, the SCEF/NEF 208/316 may initiate sending of network related information from a MME (in LTE) or an AMF and/or SMF (in 5G NR) to the analytics node via an appropriate interface (e.g., the S6a interface). The SCEF/NEF 208/316 may also initiate sending of related RAN signaling information to the analytics node. This RAN information may also include parameters which are currently in the 3GPP standardization process for NB-IoT specific parameters.

The collected information is analyzed at the analytics node. After performing the analysis, a result of the analysis, which may be a quantified output, is reported back to the SCS/AS 114. In addition, the result of the analysis is used to perform network optimization to address one or more root causes of the excessive degradation of the battery life of the wireless device 112 determined via the analysis. This network optimization may be performed in an automated manner. Alternatively, the result of the analysis may be communicated to the network operator (e.g., to a network optimization personnel) so that it can be used to optimize the network regarding the respective wireless device 112. This result of the analysis results in one or more actions taken with respect to the wireless device 112 to mitigate the excessive degradation of battery life at the wireless device 112. For example, these actions may include provisioning/de-provisioning, increased Power Savings Mode (PSM)/extended Discontinuous Reception (eDRX) cycle (e.g., increased "drx-InactivityTimer"), device management (e.g., battery replacement), radio signaling procedures optimization, initiating power saving mode at the wireless device 112 due to extensive handover if the wireless device 112 is a limited mobility device positioned at the edge of cell, etc. These actions are only examples. Other actions may be taken.

Figure 5:
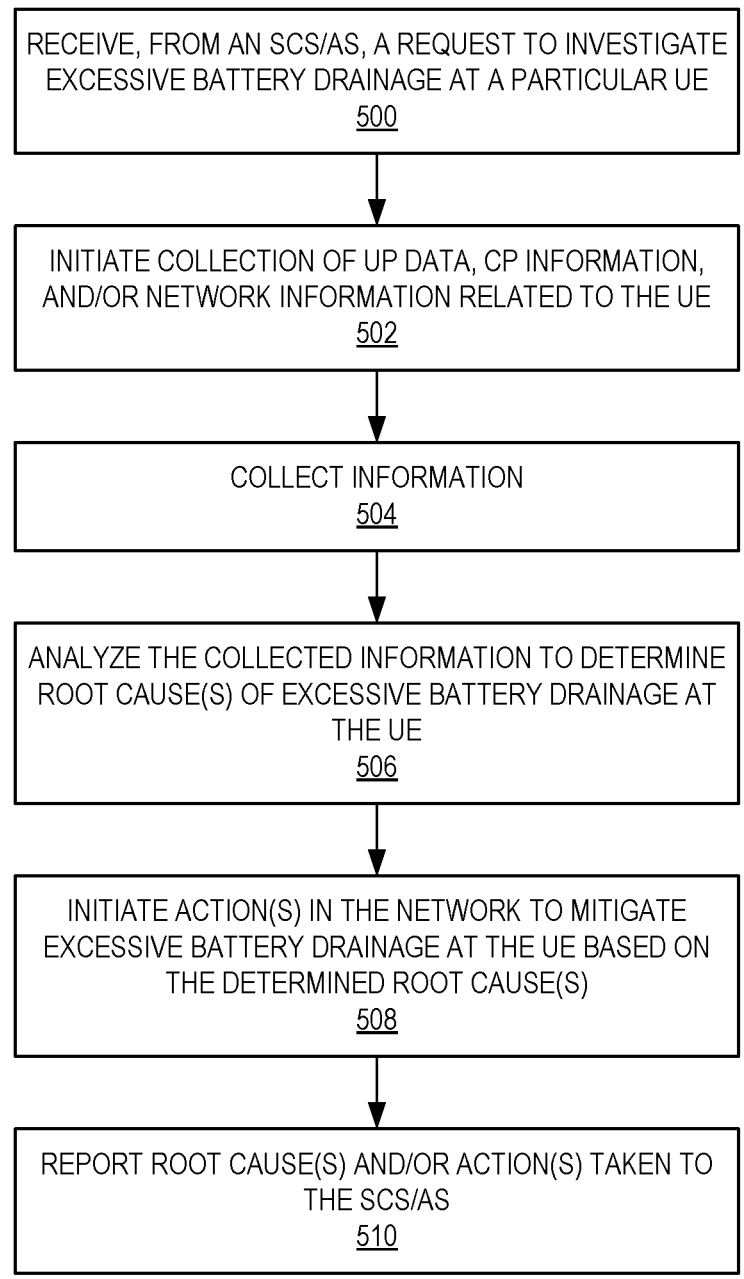
FIG. 5 is a flow chart that illustrates the operation of the core network in accordance with some embodiments of the present disclosure.

Against this backdrop, FIG. 5 is a flow chart that illustrates the operation of the core network 110 in accordance with some embodiments of the present disclosure. As illustrated, the core network 110 (e.g., the SCEF 208 or NEF 316) receives, from the SCS/AS 114, a request to investigate excessive battery drainage (i.e., excessive degradation of battery life) at a particular wireless device 112 (step 500). In some embodiments, the wireless device 112 is a MTC UE or, even more specifically, an IoT UE or NB-IoT UE. Upon receiving the request, the core network 110 (e.g., the SCEF/NEF 208/316) initiates collection of user plane data related to the wireless device 112, control plane information related to the wireless device 112, and/or network level information (which is primarily control plane information in this context, which is available to the network operator) related to the wireless device 112 (step 502). Some examples of control plane information include, but are not limited to, information regarding handovers from the wireless device 112 from one cell or base station to another and associated timestamps indicating the times at which such handovers occurred. Some examples of user plane data include, but are not limited to:

data transmitted to or received by the wireless device 112 and associated timestamps indicating times at which the data was transmitted to or received by the wireless device 112 (e.g., data representing sensor readings from the wireless device 112 in embodiments in which the wireless device 112 is an IoT senor device (e.g., a weather sensor));

information about the amount of data (size), frequency of data transfer, pattern of data transfer, etc.

In some embodiments, the SCEF/NEF 208/316 initiates sending of this information from the appropriate network nodes (e.g., the HSS 206, MME 204, AMF 300, SMF 308, base station 102) to the analytics node. This may be done in any suitable manner. For example, the SCEF/NEF 208/316 may instruct the appropriate network nodes to report this information to the analytics node or instruct the analytics node to obtain this information from the respective network nodes. Further, in some embodiments, the SCEF/NEF 208/316 is a network node from which information is collected.

As an example, the SCEF/NEF 208/316 may initiate sending of information (e.g., user plane data) transferred to or from the wireless device 112 from the SCEF/NEF 208/316 itself to the analytics node. As another example, the SCEF/NEF 208/316 may initiate sending of control plane information and/or network information related to the wireless device 112 from the HSS 206 to the analytics node. As yet another example, the SCEF/NEF 208/316 may initiate sending of control plane information related to the wireless device 112 from the MME 204, AMF 300, or SMF 308 to the analytics node.

The core network 110 (e.g., the analytics node) collects and stores the information (step 504). The core network 110 (e.g., the analytics node) analyzes the collected information to determine a root cause(s) of excessive battery drainage at the wireless device 112 (step 506). In some embodiments, the analysis uses pattern detection to detect issues such as, for example, excessive handovers back and forth between two or more adjacent cells (e.g., due to the wireless device 112 being located near a cell edge between the two or more adjacent cells), excessive handovers back and forth between two or more adjacent cells where in some cells the wireless device 112 does not transmit or receive any user plane data, excessive user plane data transmissions by the wireless device 112 (e.g., due to some environmental condition—as an example, a weather sensor repeatedly transmitting the same data during severe weather conditions), or the like. In some embodiments, the result of the analysis is quantized. For example, once a pattern indicative of excessive handovers is detected, the result of the analysis may be an indication of "excessive handovers" as a root cause of the excessive battery drainage at the wireless device 112.

The core network 110 (e.g., the analytics node) initiates one or more action(s) to mitigate excessive battery drainage at the wireless device 112 based on the determined root cause(s) (step 508). For example, if the determined root cause is excessive handovers, then the core network 110 may initiate a change in one or more handover parameters for the wireless device 112 such that the number of handovers is reduced. As another example, if the determined root cause is excessive user plane data transmission, the core network 110 may initiate a change in a PSM/Discontinuous Reception (DRX) cycle of the wireless device 112 such that the number of user plane data transmissions from the wireless device 112 is decreased. In some embodiments, the action(s) to be taken are determined and initiated in an automated manner (i.e., without human intervention). However, in some other embodiments, the action(s) to be taken may be determined and initiated by a human (e.g., personnel of the network operator) based on the results of the analysis. Note that manual intervention might need more analysis and could be a triggering point for future enhancement such as, e.g., increasing the number of base stations in a particular area for increased coverage and this needs further planning, investment, approvals, etc.

The core network 110 may also report the root cause(s) of excessive battery drainage at the wireless device 112 and/or the action(s) taken to address the root cause(s) to the SCS/AS 114 (step 510). For example, the analytics node may report the root cause(s) and/or action(s) taken to the SCEF/NEF 208/316, which then reports this information to the SCS/AS 114.

Figure 6:
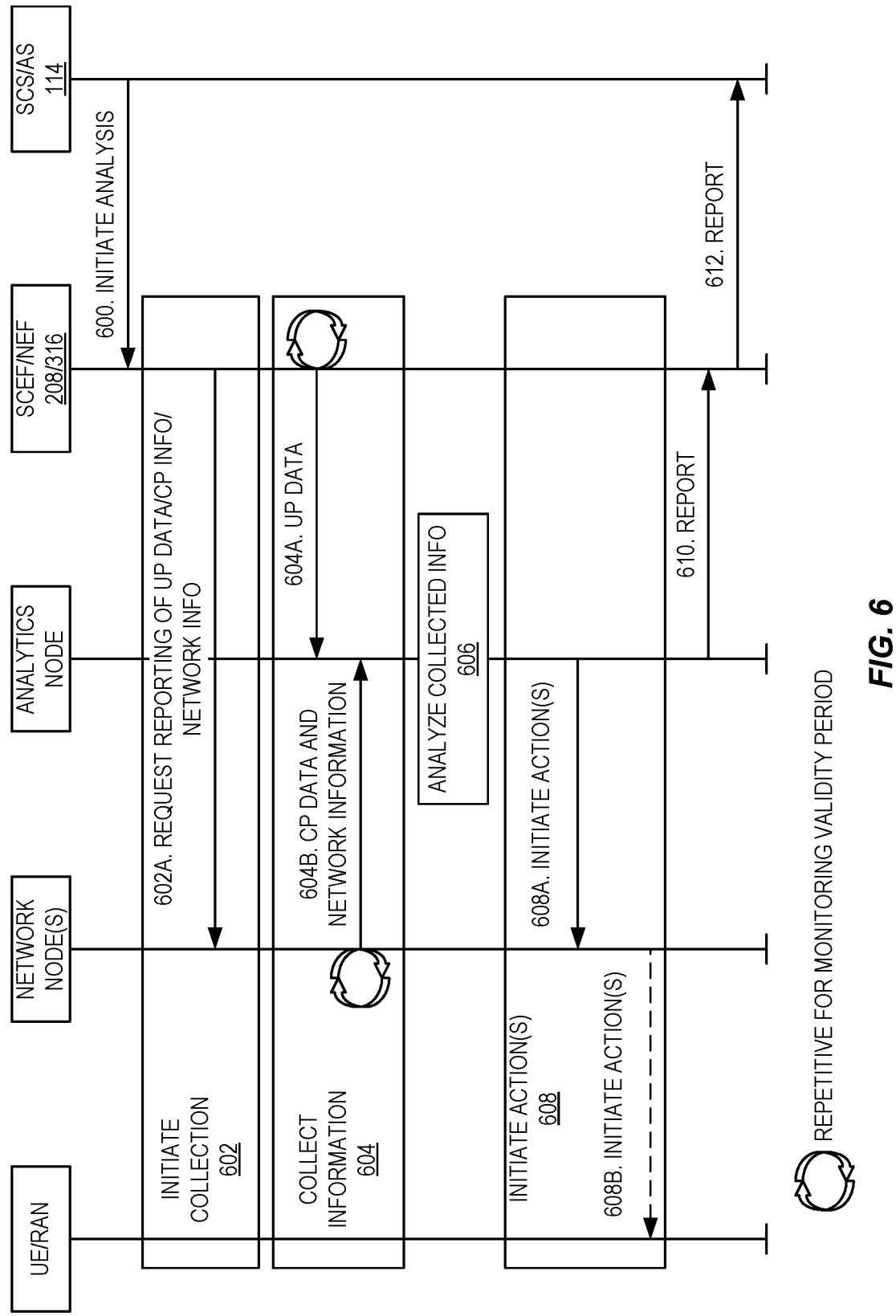
FIG. 6 is a diagram that illustrates the operation of various network nodes in the cellular communications network in accordance with embodiments of the present disclosure.

FIG. 6 is a diagram that illustrates the operation of various network nodes in the cellular communications network 100 in accordance with embodiments of the present disclosure. This process is similar to that illustrated in FIG. 5. As illustrated, the SCS/AS 114 sends a request to the SCEF/NEF 208/316 to request to investigate excessive battery drainage (i.e., excessive degradation of battery life) at a particular wireless device 112 (step 600). In some embodiments, the wireless device 112 is a MTC UE or, even more specifically, an IoT UE or NB-IoT UE. Upon receiving the request, the SCEF/NEF 208/316 initiates collection of user plane data transmitted to or received by the wireless device 112, control plane information related to the wireless device 112, and/or network information related to the wireless device 112 (step 602). More specifically, in some embodiments, the SCEF/NEF 208/316 sends a request to one or more network nodes (e.g., the HSS 206, MME 204, AMF 300, SMF 308, base station 102) to request that those network nodes report information related to the wireless device 112 to the analytics node (step 602A).

The analytics node collects and stores the information (step 604). More specifically, in this example, the SCEF/NEF 208/316 sends user plane data related to the wireless device 112 to the analytics node (step 604A), and the one or more network nodes send control plane data and other network information related to the wireless device 112 to the analytics node (step 604B). Steps 604A and 604B are performed repetitively over some period of time as new information becomes available.

The analytics node analyzes the collected information to determine a root cause(s) of excessive battery drainage at the wireless device 112 (step 606). One the analysis is complete and the root cause(s) have been determined, the analytics node initiates one or more action(s) to mitigate excessive battery drainage at the wireless device 112 based on the determined root cause(s) (step 608). In this example, the analytics node initiates one or more actions at one or more network nodes (e.g., initiates updates to a network parameter(s)) (step 608A), and optionally the network nodes may initiate respective action(s) at the RAN and/or UE (step 608B).

The analytics node reports the root cause(s) of excessive battery drainage at the wireless device 112 and/or the action(s) taken to address the root cause(s) to the SCEF/NEF 208/316 (step 610), which then reports this information to the SCS/AS 114 (step 612).

Details regarding some specific embodiments will now be described.

As discussed above, when the SCS/AS 114 detects an abnormal behavior in the deviation pattern of the battery life of the wireless device 112 from the forecasted level, the SCS/AS 114 will initiate a trigger towards SCEF/NEF 208/316 to collect additional information to be used for analysis and corrective action if possible. The additional information will be captured on a regular interval (e.g., for 2 months). The additional information may include control plane information, user plane data, and network information related to the wireless device 112 collected from the core network 110 and the RAN. The collected information is stored the analytics node (e.g., the NWDAF in 5G). This will ensure that network level information and user plane information can be further correlated for meaningful analysis at the analytics node for post-collection analysis and network optimization.

As an example, the SCS/AS 114 may determine the battery level deviation of a particular wireless device 112 (e.g., a particular IoT UE) with some degree of confidence (e.g., determine that there is a 25% deviation in the battery level of a particular IoT device). The SCS/AS 114 then sends a message to the SCEF/NEF 208/316 to trigger investigation of this deviation in the battery life of the wireless device 112. This message may, as an example, be encapsulated in the body of a Hypertext Transfer Protocol (HTTP) POST request in a format such as the JavaScript Object Notation (JSON) format shown below:

```
Sequence 0
{
    "UEID":0829035430621,
    "Deviation":0.25,
    "Monitoring Validity - Days": 90
    "Time": 1515420560
}
```

The message contains an indication of the level of deviation in the battery life of the wireless device 112. The identity of the wireless device 112 is the value of the UEID key (as in UE identity), and the value of the key is in this case the International Mobile Subscriber Identity (IMSI) of the wireless device 112. The message also contains a Deviation key. Its value is an indication of the deviation in the battery level of the wireless device 112 specified by the AS. In the above example, this value is normalized between 0 and 1, the latter indicating absolute deviation. The "Monitoring Validity—Days" key contains the period in days for which the lifetime of the analysis information is valid at the analytics node. In the above example, the analysis information for the wireless device 112 is valid for 90 days. Finally, the message includes a timestamp indicating the exact time and date of detection. The example uses a compact UNIX timestamp, which is the total number of seconds since UNIX Epoch (Jan. 1, 1970). The number 1515420560 would therefore translate to the 8 Jan. 2018, 7:39:20 PM GMT+05:30. The UNIX timestamp is non-limiting and other, more self-explanatory formats may also be used.

During the collection phase, the SCEF 208 initiates collection of control plane information, network information, and/or user plane data related to the wireless device 112. In this example, the SCEF 208 sends a monitoring request message to the HSS 206 to initiate a Subscriber Data Request from the MME 204 for the specific wireless device 112. This information will be RAN related UE details coming from the MME 204 towards the HSS 206 over the S6a interface. This additional parameter set is mentioned in TS 29.272 as below.

This additional information request is triggered from the SCEF 208 towards the HSS 206 over the S6t interface to capture the below information from the HSS 206 towards the analytics node for the wireless device 112:

```
Sequence 2
{
    IMEI
    3GPP2-MEID
    Software-Version
    Equipment-Status
    Network-Access-Mode
    Time-Zone
    Daylight-Saving-Time
    Subscription-Data-Flags
    UE-Reachability-Configuration
    Last-UE-Activity-Time
    User-State
    MME-User-State
    MME-Location-Information
    Subscribed-Periodic-RAU-TAU-Timer
    MDT-Configuration
    EPS-Subscribed-QoS-Profile
    Access-Restriction-Data
    PDN-Connection-Continuity
    eDRX-Cycle-Length
}
```

In addition to the above RAN information, the SCEF 208 will also request that the HSS 206 provide, to the analytics node, the specific parameters below for the specific wireless device 112 for which information is being collected (these parameters are currently in the 3GPP standardization process):

Traffic Profile Pattern—Single uplink only, single downlink only, single uplink only followed by single downlink only, single uplink only followed by multiple downlinks, multiple uplinks followed by single downlink only. The parameter "Traffic_Profile_Pattern" will denote the profile pattern of the User Plane data. This will have values as SUL, SDL, SULSDL, SULMDL, MULSDL.

Typical Packet size—Size of the Payload in uplink and downlink. The parameter will be "Typical_Packet_Size" with numerical values as its dataset.

Large File Indication—This parameter "Larger_File_Indication" will indicate if the uplink/downlink data is of heavy nature or not typically for firmware upgrades. The values will be "Y" or "N".

All the above wireless device 112 information in Sequence 0 and Sequence 2 (Control Plane and additional network information) and User Plane information Sequence 1 (see below) will be stored in the analytics node for the time period mentioned in "Monitoring Validity—Days" parameter sent from the SCS/AS 114 to the SCEF 208.

During the tenure of the lifecycle of the above parameters, this information will be used for analysis and battery power pattern learning mechanism performed at the analytics node. The quantified outcome of the continuous and periodic pattern analysis of the power consumption behavior of the wireless device 112 is sent from the analytics node to the HSS 206 and further sent to the SCEF 208 and then to the SCS/AS 114.

For the validity period of the analysis parameters, the required pattern analysis will be performed at the analytics node. This analysis will be ongoing on a continuous and time stamped basis and will differ as per operator criteria and rules (see, e.g., FIG. 8).

Figure 7:
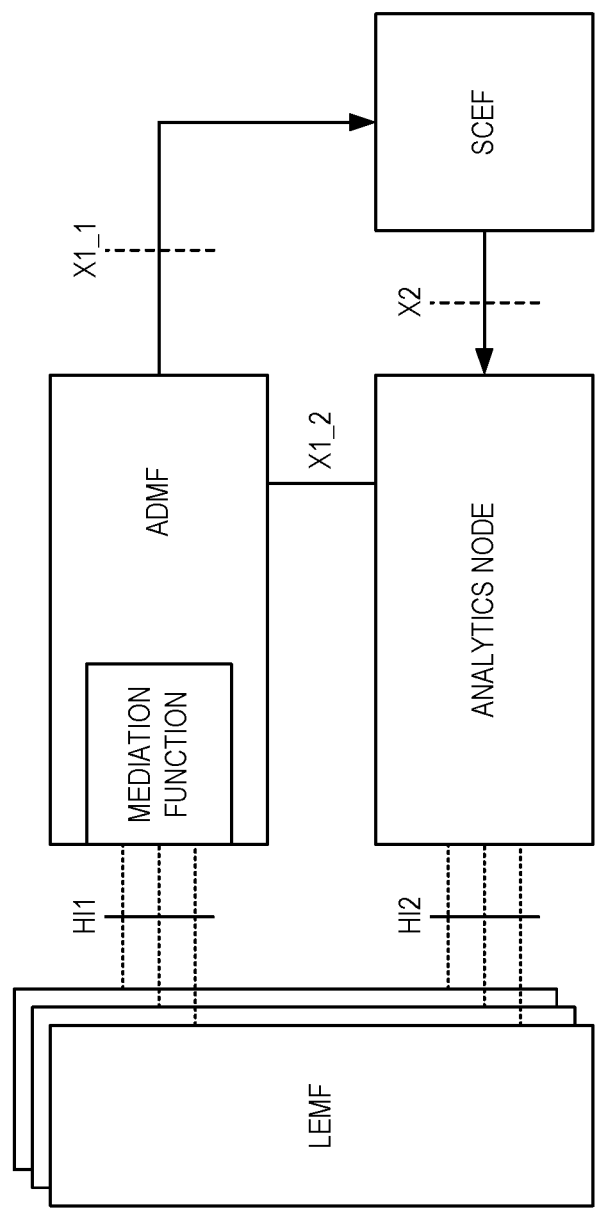
FIG. 7 illustrates one example of the collection of user plane data of the wireless device by the analytics node from the Service Capability Exposure Function (SCEF) over the Law Enforcement Monitoring Facility (LEMF) X2 interface.

Regarding the collection of user plane information, in this example, user plane information is collected from the SCEF 208. More specifically, upon receiving the message from the SCS/AS 114 triggering investigation of the battery life degradation of the particular wireless device 112, the SCEF 208 will be triggered to initiate collection of user plane data of the wireless device 112 at the analytics node. FIG. 7 illustrates one example of the collection of user plane data of the wireless device 112 by the analytics node from the SCEF 208 over the Lawful Enforcement Monitoring Facility (LEMF) X2 interface. This user plane information of the wireless device 112 is sent by the SCEF 208 to the analytics node over an additional interface to the analytics node. This interface will be similar to X2 interface for the HSS 206 defined in TS 33.107.

In some embodiments, the user plane data of the wireless device 112 is similar to the parameters specified in OMA Device Web Application Program Interface (API) (OMA-ER-Device_WebAPs-V1_0-20160419-C). As an example, the device related user plane message structure is as below:

```
Sequence 1
{
  "Type"
  "Metric-Id"
  "Supplemental - Types"
  "Nu-Observed Value"
  "Unit-Code"
  "productName" - ABC Blood Pressure Pro
  "manufacturerName" - ABC Inc.
  "modelNumber" - TP-001
  "firmwareRevision" - rev.1.001.003
  "serialNumber" - 01234-5678-9ABCD-EF01
  "softwareRevision" - rev.2.000.000
  "hardwareRevision" - rev.1.0
  "partNumber" - 002
  "protocolRevision" - rev.3.1
  "system Id" - ABCDEF0123456789
  "batteryLevel" - 0.6
}
```

The "Type" Key value specifies the Sensor information type (e.g., OMA specification mentions this as Medical Device Communication) as the key value. The "Metric-Id" Key value specifies MDC type subcode as specified in the OMA Specification. The "Nu-ObservedValue" Key value specifies the Sensor information value, e.g. temperature, pulse rate, Weight, Humidity, Voltage, Blood Pressure, etc. The "Unit-Code" specifies the unit information for the specified Observed Value. The above device information is taken as an example specified in OMA specification OMA-TS-Blood_Pressure_Monitor_APIs-V1_0-20160419-C. Note that sequence 0 does not directly provide handover information, but it highlights the product/sensor details, firmware details, etc. Sequence 2,3 provides information on handover details like targeted base station, type of handover (InterRan/IntraRAN), cause of handover initiation, an indication of who initiated the handover (network or UE), etc.

Figure 8:
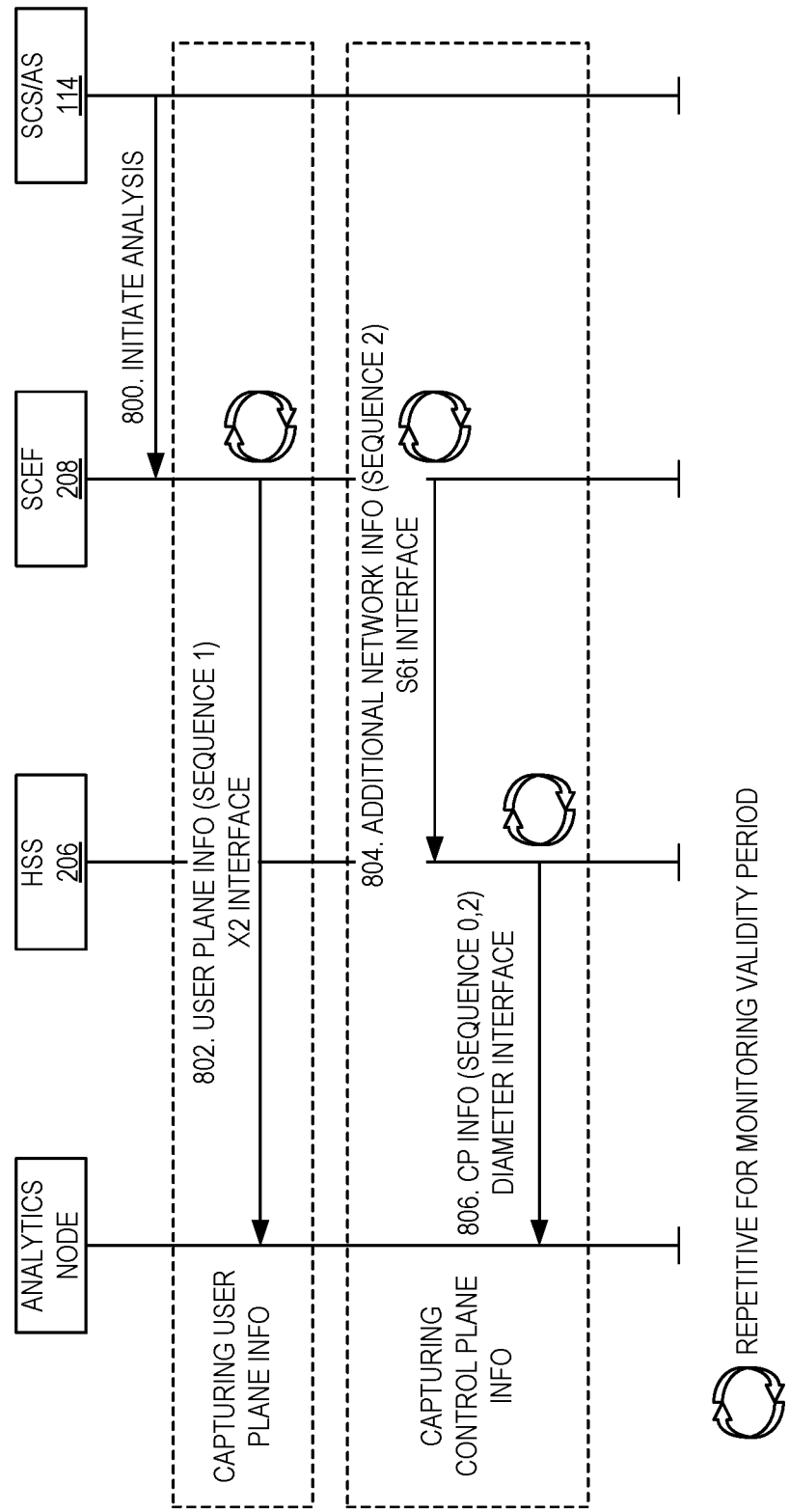
FIG. 8 illustrates one example of a collection phase in accordance with some embodiments of the present disclosure.

FIG. 8 illustrates one example of a collection phase in accordance with some embodiments of the present disclosure. As illustrated, the SCS/AS 114 initiates investigation of excessive battery life degradation at a wireless device 112 (e.g., an IoT device) (step 800). In other words, the SCS/AS 114 initiates battery pattern information assimilation and analysis. This action will lead to two steps initiated by SCEF 208, namely, user plane data collection and control plane/RAN/network level information collection. In this example, the SCEF 208 sends user plane data of the wireless device 112 to the analytics node over a new X2 interface similar to one defined in TS 33.107 (step 802). In one example, this user plane data has parameters as defined in Sequence 1 mentioned above.

Figure 9:
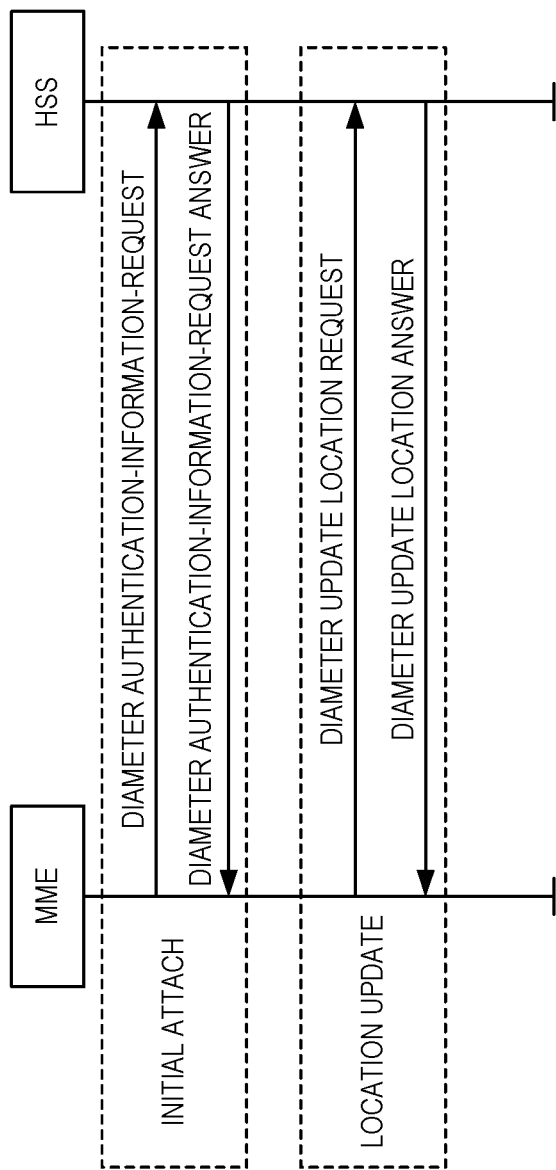
FIG. 9 illustrates an Initial Attach procedure and a Location Update procedure.

In addition, the SCEF 208 sends a monitoring request message towards the HSS 206 over S6t interface (step 804) to initiate sending of the control plane information and additional IoT specific RAN information (Sequence 2) from the HSS 206 towards the analytics node for the wireless device 112. This control plane and additional IoT specific RAN information includes parameters that are available within the HSS 206 in current systems. The HSS 206 receives these control plane parameters as part of, e.g., the Initial Attach and Location Update procedures from the MME 204 as specified in TS 29.336, which for convenience are illustrated in FIG. 9. The details of these procedures are well known and therefore not described here.

After the request from the SCEF 208, the HSS 206 sends the Sequence 0 & 2 parameters towards the analytics node over a new Diameter interface (step 806). The analytics node stores the information received in steps 802 and 806 for pattern analysis to determine the root cause(s) of the degradation in battery life at the wireless device 112. This information is stored in the analytics node for the monitoring validity period.

Figure 10:
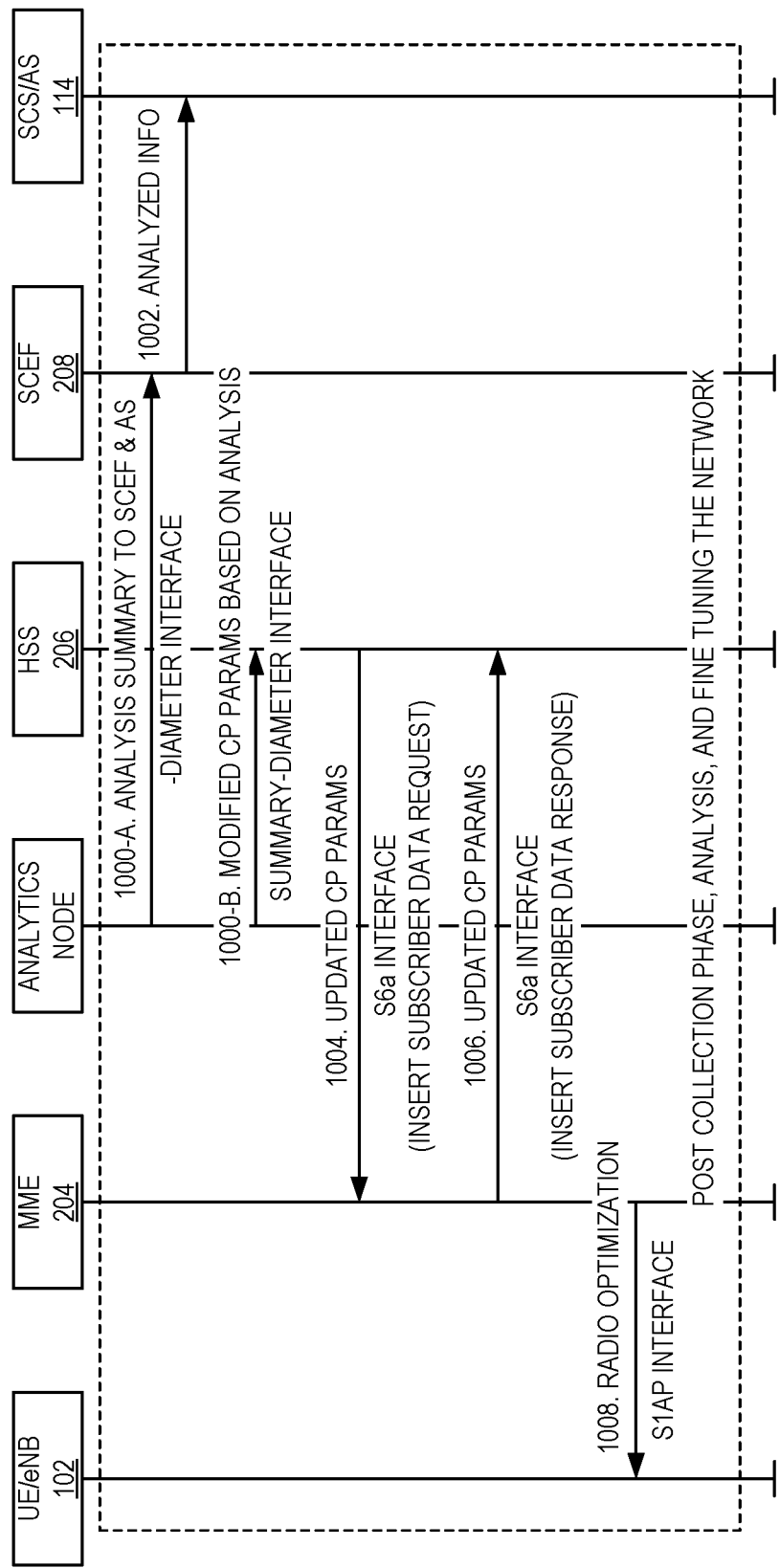
FIG. 10 illustrates a post collection phase in which the collected information is analyzed and utilized for reporting and network optimization in accordance with some embodiments of the present disclosure.

FIG. 10 illustrates a post collection phase in which the collected information is analyzed and utilized for reporting and network optimization in accordance with some embodiments of the present disclosure. As illustrated, at the end of the analysis which is typically by the time the validity time of the dynamic parameters expires, the analysis summary including a quantified analysis output is sent from the analysis node to the SCEF 208 (step 1000-A).

The analysis summary encapsulates the pattern analysis of the wireless device 112 and has values such as, e.g., "Excessive HO," "High SUL," "High SULMDL," "High SULSDL_High Temperate," etc. The purpose of the analysis summary is to summarize the possible pattern involving both user plane and control plane information from the analytics node. The modified and corrective control plane parameters values will be based on the pattern analysis values which will be sent to the HSS 206. This analysis summary also enables the SCS/AS 114 to track the power pattern behavior of the wireless device 112.

In this example, the analytics node also sends modified control plane parameters to the HSS 206 (step 1000-B). The modified control parameters are modified in such a manner as to mitigate the determined root cause(s) of the excessive battery life degradation at the wireless device 112 (i.e., are modified based on the analysis summary). The modified control parameters may include, e.g., Update "eDRX cycle time" parameter: Analysis predicted that, due to "X" reason, the battery is being consumed more and, therefore, eRDX cycle should be increased to reduce battery consumption.

Update "Subscribed-Periodic-RAU-TAU-Timer" parameter: The wireless device 112 obtains the list of Tracking Area Identity (TAI) area while registering with the network. The wireless device 112 does not have to send the TAU message as long as it is in the TAI area (and idle state). However, even if it is in the TAI area (and incase it is IDLE state for along time, a Tracking Area Update (TAU) message is sent to ensure that network knows the wireless device 112 is connected/reachable. Optimization on TAU message timer can further optimize battery consumption at the wireless device 112.

In 5G NR, the network can request the change in the status of the wireless device 112 to Radio Resource Control (RRC) Inactive and set a timer to wake up the wireless device 112. 5G NR has introduced a new RRC State named "RRC Inactive state" to support features like widely configured DRX cycle for power consumption optimization, optimizing UE based mobility, RAN based paging for limited mobility UEs, etc.

Support of Inter-Radio Access Technology (RAT) Mobility optimization by enhancing the measurement gap. This is usually the period in which the wireless device 112 measures the Inter Frequency/Inter-RAT candidates and does not transmit or receive any data from the serving cell.

The SCEF 208 sends the analysis summary (or some information obtained from or derived from the analysis summary) to the SCS/AS 114 (step 1002), e.g., as a monitoring event report over the Diameter interface like any other defined event reporting procedure in TS 23.682 (Section 5.6.3). As an example, the report may state that there is "x" reason why the battery consumption is more than expected (e.g., where "x" may be, as an example, "excessive handover" due to the wireless device 112 being at the edge of cell). The information sent from the SCEF 208 to the SCS/AS 114 acknowledges to the SCS/AS 114 that an analysis has been performed for the wireless device 112 per request. The SCS/AS 114 may further use this information for any Enterprise level UE related information update. This information may indicate the root cause(s) determined by the analysis and/or the action(s) initiated by the analysis node in the network to address the root cause(s).

In this example, the HSS 206 sends the updated control plane parameters (e.g., updated control parameters such as, but not limited to, those in Sequence 2) to the MME 204, e.g., over the S6a interface in the Insert Subscriber Data Request (step 1004). The MME 204 responds back to acknowledge receipt of the updated parameters (step 1006). The MME 204 utilizes the updated control plane parameters to perform radio signaling optimization, e.g., over the S1AP interface, toward the eNB 102 for the wireless device 112 (step 1008). The objective of sending this analysis output to the MME 204 and subsequent updating of the parameters at the eNB 102 and/or at the wireless device 112 is to further optimize the operation of the network and/or the wireless device 112 so as to prevent unnecessary battery power dissipation at the wireless device 112. As an example, the analyzed output (i.e., the updated control plane parameters in this example) will be sent to the eNB 102 for radio optimization for the wireless device 112. The optimization could be for, e.g., change in eDRX cycle time, change in Power Saving Mode, or increase the TAU/Routing Area Update (RAU) value, etc. for the wireless device 112 which has less than expected battery level.

In this example, the analytics node sends the analyzed information to the HSS 206 over the diameter interface. Using the analyzed output, the HSS 206 sends the updated control plane parameters (e.g., Sequence 2 parameters) towards the MME 204 over the S6a interface. This will denote the radio optimizations due to the analyzed output by the analytics node. The MME 204 will then perform the required radio optimization at the eNB 102 and further to the wireless device 112.

Please note that, as discussed above, this optimization is valid on a 5G network also including network elements like NEF, Network Data Analytics Function (NWDAF), and 5G NR. However, for the sake of clarity, the example above focuses on LTE.

Now, the discussion turns to two example scenarios in which embodiments of the present disclosure may be used to mitigate excessive battery life degradation at a wireless device 112. In these scenarios, the wireless device 112 is an IoT sensor.

Scenario A: Excessive Handovers even though the IoT sensor is deployed for limited mobility (e.g., robot working in a warehouse) because the IoT device is positioned at the edge between two adjacent cells, which leads to excessive handovers back and forth between the two adjacent cells.

Scenario B: Additional payload/constant changes in the environment sensor data, i.e. frequent changes in user payload data.

For each of these scenarios, the embodiments described herein collect user plane, control plane, and network information related to the IoT device, analyze the collected information to determine the root cause of excessive battery life degradation at the IoT device, and take corrective action.

Scenario A—Excessive Handover:

This scenario depicts the case when the IoT UE is positioned on the edge between two adjacent cells of two base stations due to which there are excessive handovers. In such a situation, control plane information related to the IoT device is captured whenever handover signaling is exchanged during the monitoring validity period.

Figure 11:
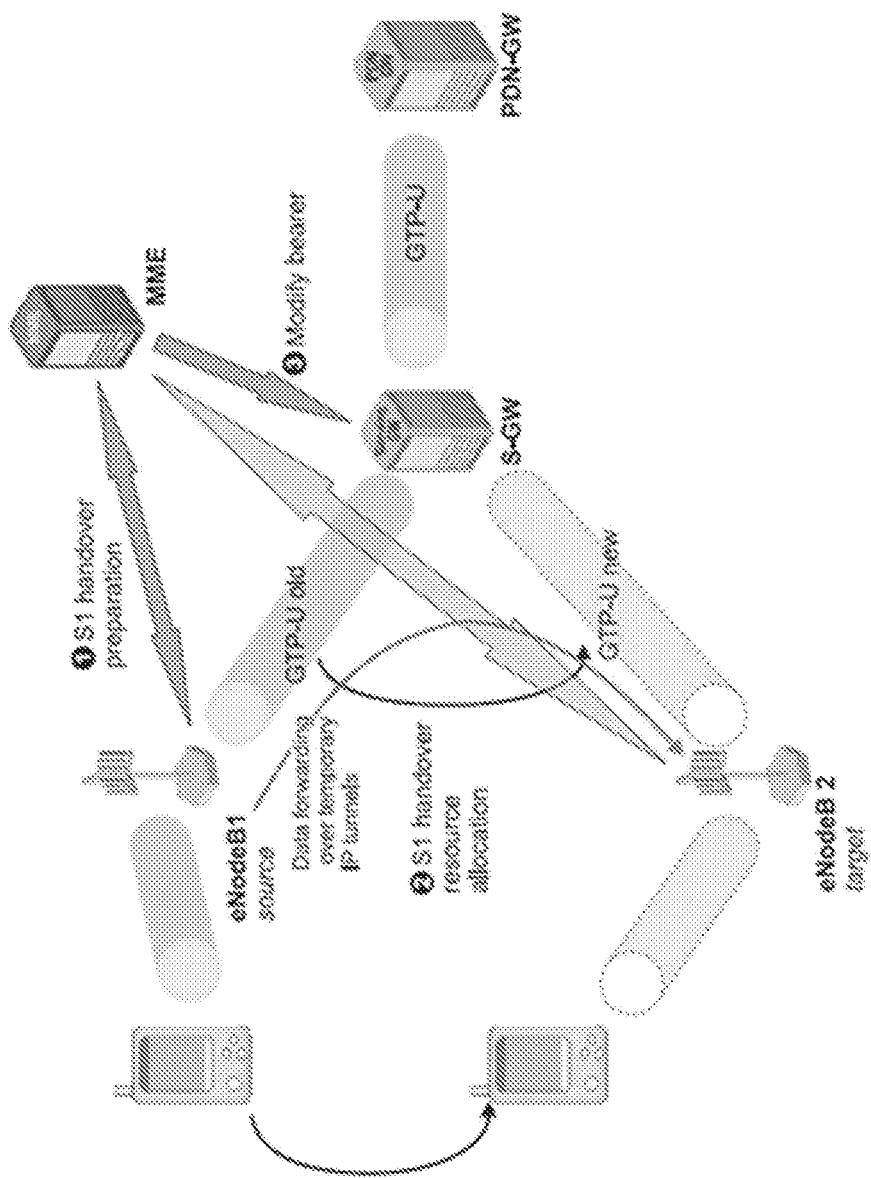
FIG. 11 illustrates a typical S1 handover procedure between a source and a target base station.

As an example, a typical S1 handover procedure between a source and a target eNB is illustrated in FIG. 11. The S1 handover control plane data at the MME is captured (i.e., collected and stored at the analytics nodes). This control plane information is collected from the MME and include, as an example, the below sequence of data:

```
Sequence 1 - HandoverPreparation
{
    MME-UE-S1AP-ID
    eNB-UE-S1AP-ID
    HandoverType
    Cause
    radioNetwork
    targeteNB-ID
    pLMNidentity
    macroENB-ID
    tAC
}
Sequence 2 - HandoverResourceAllocation
{
    MME-UE-S1AP-ID
    HandoverType
    uEaggregateMaximumBitrate
    uEaggregateMaximumBitRateDL
    uEaggregateMaximumBitRateUL
    E-RABToBeSetupListHOReq
    E-RABToBeSetupItemHOReq
    e-RAB-ID
    gTP-TEID
    qCI
    pre-emptionCapability
    pre-emption Vulnerability
    encryptionAlgorithms
    SecurityContext
    nextHopChainingCount
}
Sequence 3 - Modify Bearer Request
(
    TEID
    IPv4 Address
    Interface Type
    Bearer Context
    EPS Bearer ID
```

-continued

```
        Fully Qualified Tunnel Endpoint Identifier
        51-U eNodeB GTP-U interface
    )
```

On similar lines, there could be additional control plane information related to the IoT device which is captured at the HSS from the SCEF during the monitoring validity period. The control plane information captured at the HSS is exemplified as:

```
    Sequence 4 - NIDD Information Request / Response
    (
        Auth-Session-State
        Origin-Host
        Origin-Realm
        Destination-Realm
        User-Identifier
    )
```

Figure 12:
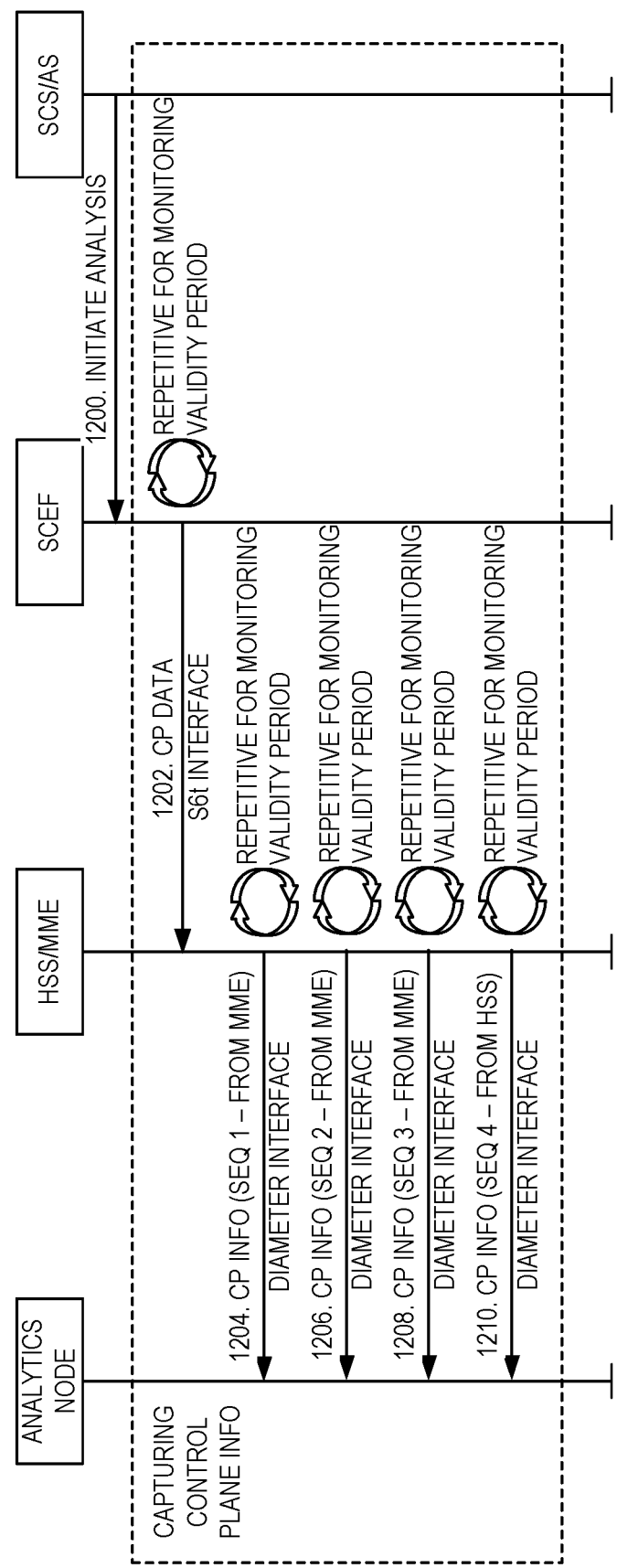
FIG. 12 illustrates an example of capturing control plane information at the analytics node.

All the above control plane information related to the IoT device is sent to the analytics node for the battery dissipation pattern analysis as shown in FIG. 12 (see in particular steps 1204-1210). The analytics node uses this information to determine the root cause of excessive battery life degradation at the IoT device as excessive handovers.

Scenario B—Payload/Changes in IoT UE Sensor Data:

This scenario depicts the situation when there is a variation in the payload or environmental data as coming from the user plane data of the IoT device, which will be sent to the analytics node for analysis to determine the root cause of the excessive battery life degradation. The user plane data of the IoT device is collected and analyzed by the analytics node to see if there is any deviation in the payload, frequency of communication, sensor information, etc. which is sent on the user plane that could possibly be responsible for the battery dissipation.

As an example, the below sequence is used for the exemplification of a user plane data for the IoT device where the IoT device is a sensor in a mining environment:

```
    Sequence 1
    (
        Moisture levels
        Temperature levels
        Lighting levels
        Dust Levels
        Equipment Vibration data
        Positioning data
        Payload
    )
```

Figure 13:
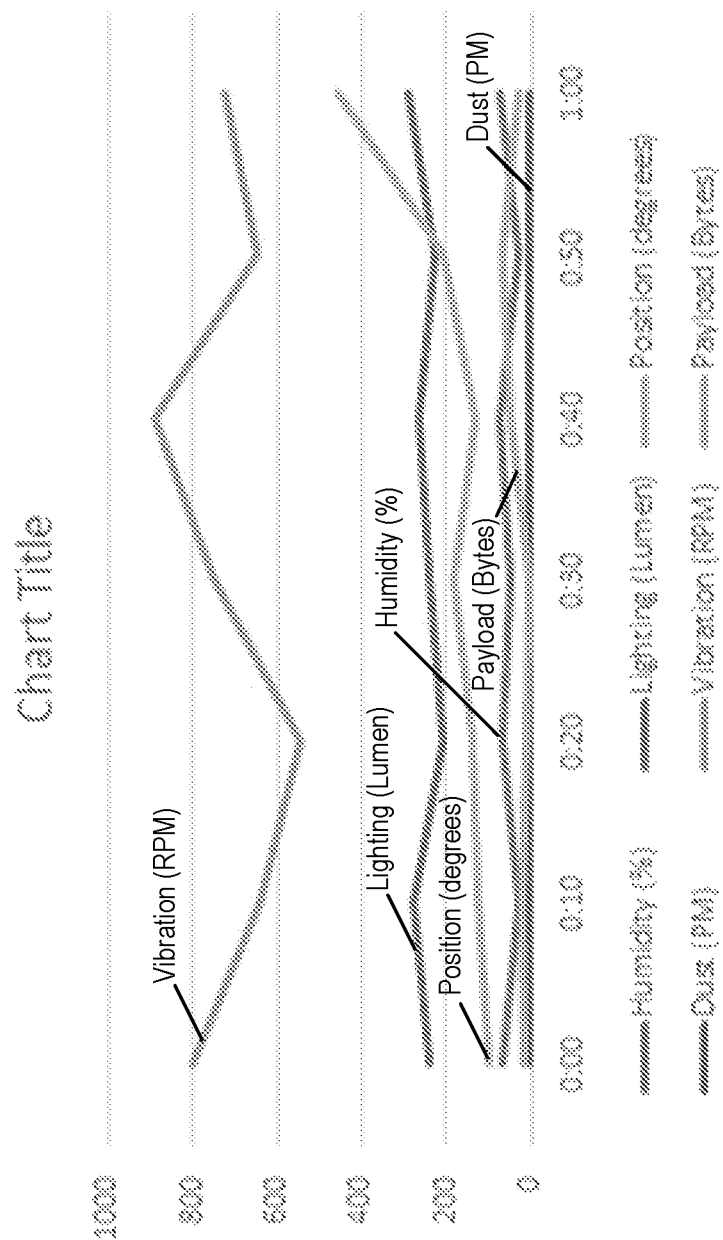
FIG. 13 illustrates that user plane data can be captured against a time stamp.
Figure 14:
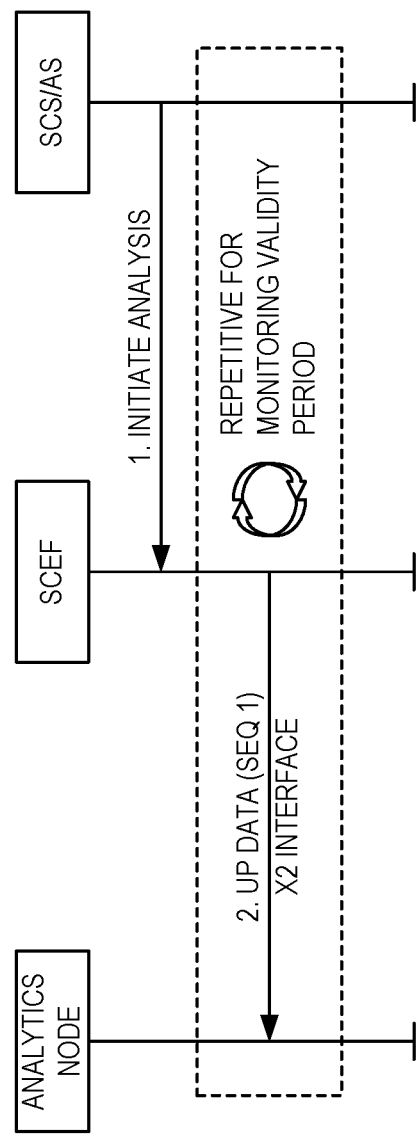
FIG. 14 illustrates an example of sending of data to the analytics node for the monitoring duration for the battery dissipation analysis.

The above user plane data of the IoT device is captured as discussed above. This user plane data will be captured against a timestamp as depicted in FIG. 13. This data is sent to the analytics node for the monitoring duration for the battery dissipation analysis as shown in FIG. 14.

After the analysis is performed by the analytics node, the analysis summary is quantified and sent to the SCEF (and the SCS/AS), as discussed above. As an example, the summary report encapsulates the pattern analysis of the IoT device and its value ranges such as—'Excessive HO,' "Irregular Lighting&QCI Variation," "Irregular Positioning& pre-emptionVulnerability," etc.

Based on this analysis summary, corrective action is taken. For example, one or more updated control plane parameters are notified to the HSS (and subsequently to the MME) for the network optimization. Additionally, the analysis summary can also be sent to network operations and management for any corrective action to be taken at the network operations and management level.

The systems and methods disclosed herein provide a number of advantages. As one example, information details regarding a wireless device (e.g., an IoT UE) can be collected at the analytics node, which is managed by the network operator. This will help in building a one stop shop repository for all the necessary wireless device related information required for the analysis, which was not available as of today.

For an IoT or NB-IoT UE, the analysis summary reported to the SCEF and further to the AS enables the AS to take preemptive and corrective action towards provisioning and other optimization activities towards the IoT UE or NB-IoT UE class.

The solution can further be extended to send the output of the analysis to NWDA or any other network function or outside network function. The network operator can expose the analytics node to authorized IoT/Enterprise for further analysis (e.g., based on an OMA interface). API based charging model can be applied for revenue model.

With massive IoT UE deployment, the operator will benefit with necessary maintenance and optimization activities and will be able to focus with much precision on the affected IoT UEs only instead of manual investigation of the degrading battery life. Additionally, the network operator will play a more crucial role as an intelligent medium rather than a simple bit pipe for IoT/Enterprise devices.

Figure 15:
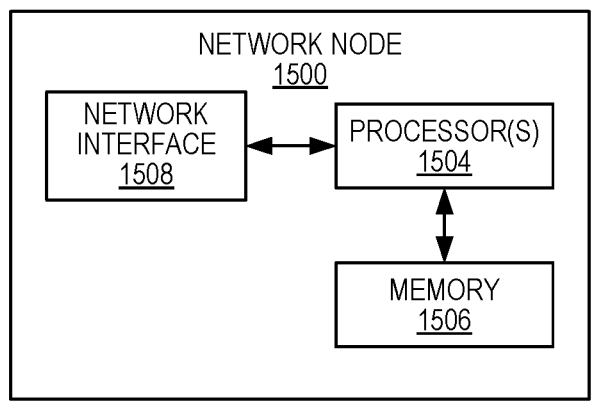
FIG. 15 is a schematic block diagram of a network according to some embodiments of the present disclosure.

FIG. 15 is a schematic block diagram of a network node 1500 according to some embodiments of the present disclosure. The network node 1500 may be, for example, a core network node (e.g., a SCEF, HSS, MME, analytics node, etc.) or a network node implementing a core network function (e.g., an AMF, SMF, analytics function, SCEF, etc.). As illustrated, the network node 1500 includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. The one or more processors 1504 operate to provide one or more functions of a network node 1500 as described herein. In some embodiments, the function(s) are implemented in software that is stored, e.g., in the memory 1506 and executed by the one or more processors 1504.

Figure 16:
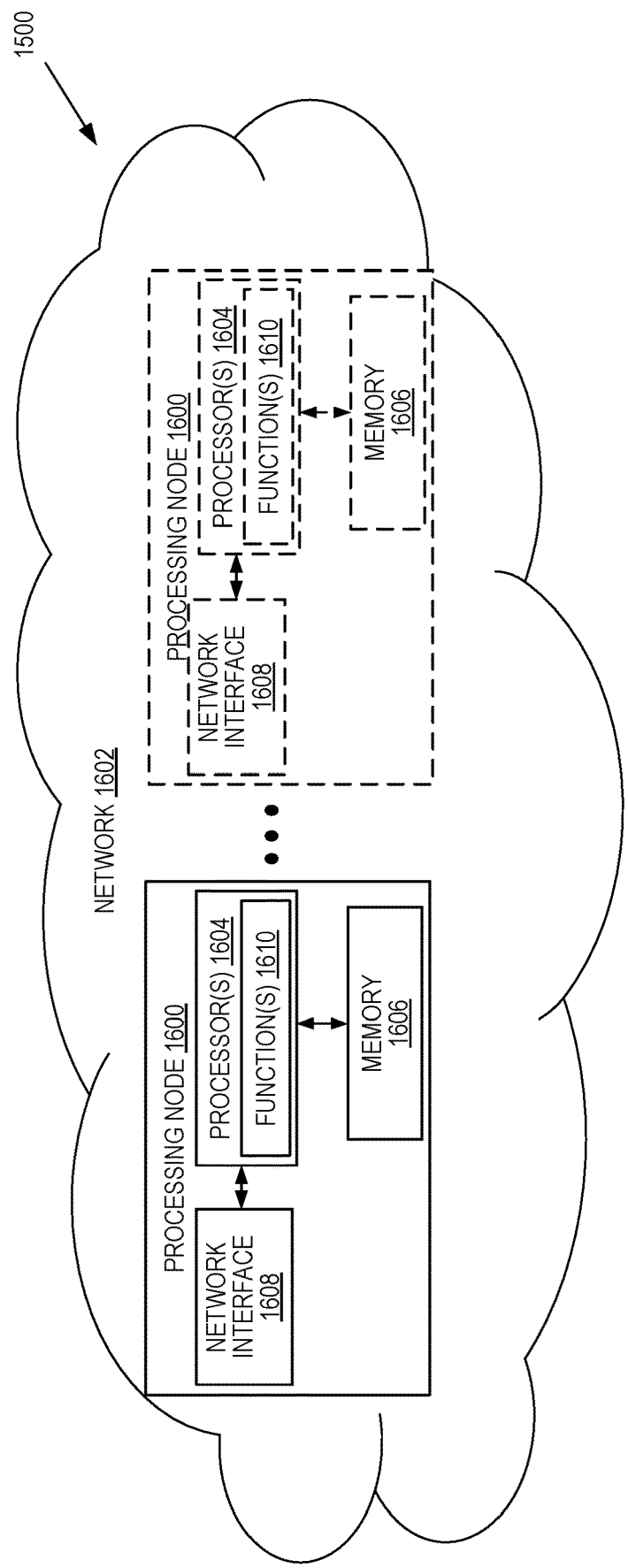
FIG. 16 is a schematic block diagram that illustrates a virtualized embodiment of the network node of FIG. 15 according to some embodiments of the present disclosure.

FIG. 16 is a schematic block diagram that illustrates a virtualized embodiment of the network node 1500 according to some embodiments of the present disclosure. This discussion is equally applicable to other types of network nodes. Further, other types of network nodes may have similar virtualized architectures.

As used herein, a "virtualized" network node is an implementation of the network node 1500 in which at least a portion of the functionality of the network node 1500 is implemented as a virtual component(s) (e.g., via a virtual machine(s) executing on a physical processing node(s) in a network(s)). As illustrated, in this example, the network node 1500 includes one or more processing nodes 1600 coupled to or included as part of a network(s) 1602. Each processing node 1600 includes one or more processors 1604 (e.g., CPUs, ASICs, FPGAs, and/or the like), memory 1606, and a network interface 1608. In this example, functions 1610 of the network node 1500 described herein are implemented at the one or more processing nodes 1600 or distributed across two or more processing nodes 1600 in any desired manner. In some particular embodiments, some or all of the functions 1610 of the network node 1500 described herein are implemented as virtual components executed by one or more virtual machines implemented in a virtual environment(s) hosted by the processing node(s) 1600.

In some embodiments, a computer program including instructions which, when executed by at least one processor, causes the at least one processor to carry out the functionality of network node 1500 or a node according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
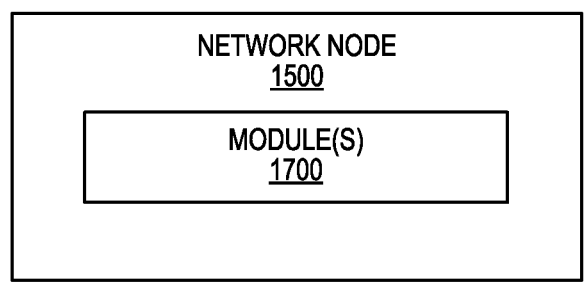
FIG. 17 is a schematic block diagram of the network node of FIG. 15 according to some other embodiments of the present disclosure.

FIG. 17 is a schematic block diagram of the network node 1500 according to some other embodiments of the present disclosure. The network 1500 includes one or more modules 1700, each of which is implemented in software. The module(s) 1700 provide the functionality of the network node 1500 described herein. This discussion is equally applicable to the processing node 1600 of FIG. 16 where the modules 1700 may be implemented at one of the processing nodes 1600 or distributed across multiple processing nodes 1600.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AF Application Function
AMF Access and Mobility Management Function
AN Access Network
API Application Program Interface
AS Application Server
ASIC Application Specific Integrated Circuit
AUSF Authentication Server Function
AVP Attribute-Value Pairs
CAT-M1 Category M1
CIoT Cellular Internet of Things
CPU Central Processing Unit
CQI Channel Quality Indicator
DN Data Network
DRX Discontinuous Reception
DSP Digital Signal Processor
eDRX Extended Discontinuous Reception
eNB Enhanced or Evolved Node B
EPC Evolved Packet Core
FPGA Field Programmable Gate Array
gNB New Radio Base Station
HSS Home Subscriber Server
HTTP Hypertext Transfer Protocol
IMSI International Mobile Subscriber Identity
IoT Internet of Things
IP Internet Protocol
JSON JavaScript Object Notation
LEMF Law Enforcement Monitoring Facility
LTE Long Term Evolution
MME Mobility Management Entity
MTC Machine Type Communication
NB-IoT Narrowband Internet of Things
NEF Network Exposure Function
NF Network Function
NR New Radio
NRF Network Repository Function
NSSF Network Slice Selection Function
NWDA Network Data Analytics
NWDAF Network Data Analytics Function
OMA Open Mobile Alliance
OPEX Operational Expenditures
OSS Operations Support System
PCF Policy Control Function
P-GW Packet Data Network Gateway
PSM Power Savings Mode
QoS Quality of Service
RAM Random Access Memory
RAN Radio Access Network
RAT Radio Access Technology
RAU Routing Area Update
RRC Radio Resource Control
RRH Remote Radio Head
RTT Round Trip Time
SCEF Service Capability Exposure Function
SCS Service Capability Server
S-GW Serving Gateway
SINR Signal to Interference plus Noise Ratio
SMF Session Management Function
TAI Tracking Area Identity
TAU Tracking Area Update
TS Technical Specification
UDM Unified Data Management
UE User Equipment
UEID User Equipment Identity
UPF User Plane Function
VPLMN Visited Public Land Mobile Network Those skilled in the art will recognize improvements and modifications to the embodiments of the present disclosure. All such improvements and modifications are considered within the scope of the concepts disclosed herein.

What is claimed is:

1. A method in a core network of a cellular communications system, comprising:
   receiving, from an external entity, a request to investigate excessive battery drainage at a particular wireless device;
   initiating collection of information related to operation of the wireless device in the cellular communications system, the information comprising user plane data related to the wireless device, control plane information related to the wireless device, and/or network information related to the wireless device;

collecting the information from one or more network nodes in the cellular communications system;

analyzing the collected information to determine one or more root causes of excessive battery drainage at the wireless device; and initiating one or more actions in the cellular communications system to mitigate excessive battery drainage at the wireless device, the one or more actions being based on the one or more root causes of excessive battery drainage at the wireless device.

2. The method of claim 1 wherein the one or more nodes include: a Service Capability Exposure Function, SCEF; a Home Subscriber Server, HSS; and/or a Mobility Management Entity, MME.

3. The method of claim 1 further comprising reporting, to the external entity, the one or more root causes of excessive battery drainage at the wireless device and/or the one or more actions.

4. The method of claim 1 wherein the information related to operation of the wireless device in the cellular communications system comprises user plane data related to the wireless device, control plane information related to the wireless device, and network information related to the wireless device.

5. The method of claim 1 wherein receiving the request to investigate excessive battery drainage at the wireless device comprises receiving the request at an exposure function of the core network.

6. The method of claim 5 wherein the cellular communications system is a Long Term Evolution, LTE, system, and the exposure function is a Service Capability Exposure Function, SCEF.

7. The method of claim 5 wherein the cellular communications system is a Fifth Generation, 5G, New Radio, NR, system, and the exposure function is a Network Exposure Function, NEF.

8. The method of claim 5 wherein:
initiating collection of the information related to operation of the wireless device in the cellular communications system comprises:
initiating, by the exposure function, reporting of user plane data, control plane information, and network information related to the wireless device from the one or more network nodes to an analytics node; and
collecting the information from the one or more network nodes comprises:
receiving the reported user plane data, control plane information, and network information at the analytics node; and
storing the reported user plane data, control plane information, and network information at the analytics node; and
analyzing the collected information comprises analyzing the collected information at the analytics node.

9. The method of claim 1 wherein analyzing the collected information comprises:
correlating the collected information with respect to time to thereby provide correlated information;
identifying a pattern of network activity based on the correlated information; and
determining the one or more root causes of excessive battery drainage at the wireless device based on the pattern of network activity.

10. The method of claim 9 wherein the pattern of network activity is a pattern of handovers back and forth between two or more adjacent cells and/or between two or more base stations, and the one or more root causes of excessive battery drainage at the wireless device comprise an excessive amount of handovers.

11. The method of claim 10 wherein the one or more actions comprise changing at least one handover parameter for the wireless device such that an amount of handovers for the wireless device between the two or more adjacent cells and/or the two or more base stations is reduced.

12. The method of claim 9 wherein the pattern of network activity is a pattern that is indicative of a variation in user plane data, and the one or more root causes of excessive battery drainage at the wireless device comprises a variation in user plane data.

13. The method of claim 12 wherein the variation in user plane data is a variation in an amount of user plane data transmitted by the wireless device, a variation in a frequency at which user plane data is transmitted by the wireless device, or a variation in content of user plane data transmitted by the wireless device.

14. The method of claim 12 wherein the one or more actions comprise increasing a sleep time for the wireless device.

15. The method of claim 1 wherein the one or more root causes of excessive battery drainage at the wireless device comprise an excessive amount of handovers.

16. The method of claim 15 wherein the one or more actions comprise changing at least one handover parameter for the wireless device such that an amount of handovers for the wireless device is reduced.

17. The method of claim 1 wherein the one or more root causes of excessive battery drainage at the wireless device comprises a variation in user plane data.

18. The method of claim 17 wherein the variation in user plane data is a variation in an amount of user plane data transmitted by the wireless device, a variation in a frequency at which user plane data is transmitted by the wireless device, or a variation in content of user plane data transmitted by the wireless device.

19. A method in a core network node of a core network of a cellular communications system, comprising:
receiving, from an external entity, a request to investigate excessive battery drainage at a particular wireless device;
initiating collection of information related to operation of the wireless device in the cellular communications system, the information comprising user plane data related to the wireless device, control plane information related to the wireless device, and/or network information related to the wireless device;
receiving a report of an analysis of the collected information, the report comprising one or more root causes of excessive battery drainage at the wireless device and/or one or more actions taken by the core network to address the one or more root causes of excessive battery drainage at the wireless device; and
providing a response to the external entity based on the report.

20. A method in a core network node of a core network of a cellular communications system, comprising:
collecting information from one or more network nodes in the cellular communications system, the information being related to operation of a specific wireless device in the cellular communications system and comprising user plane data related to the wireless device, control plane information related to the wireless device, and/or network information related to the wireless device;
analyzing the collected information to determine one or more root causes of excessive battery drainage at the wireless device; and initiating one or more actions in the cellular communications system to mitigate excessive battery drainage at the wireless device, the one or more actions being based on the one or more root causes of excessive battery drainage at the wireless device.

* * * * *